United States Patent [19]

Suzuki et al.

[11] Patent Number: 5,588,004
[45] Date of Patent: Dec. 24, 1996

[54] BUS SYNCHRONIZING METHOD AND SYSTEM BASED THEREON

[75] Inventors: Shinichi Suzuki; Yukihiro Seki; Ryuichi Hattori, all of Yokohama, Japan

[73] Assignee: Hitachi, Ltd., Tokyo, Japan

[21] Appl. No.: 405,857

[22] Filed: Mar. 17, 1995

[30] Foreign Application Priority Data

Sep. 7, 1994 [JP] Japan .................................. 6-213993

[51] Int. Cl.$^6$ ........................................................ H04J 3/06
[52] U.S. Cl. .......................................................... 370/516
[58] Field of Search ............................ 370/84, 97, 100.1, 370/105.3, 108, 85.9; 375/356, 371, 357, 362, 377, 376; 395/550; 364/271, 271.1, 271.2, 271.5

[56] References Cited

U.S. PATENT DOCUMENTS

| | | | |
|---|---|---|---|
| 5,099,477 | 3/1992 | Taniguchi et al. .................. | 370/97 |
| 5,256,912 | 10/1993 | Rios ........................................ | 375/371 |
| 5,276,858 | 1/1994 | Oak et al. ................................ | 395/550 |
| 5,305,452 | 4/1994 | Khan et al. ............................. | 395/550 |
| 5,414,820 | 5/1995 | McFarland et al. .................... | 395/325 |
| 5,432,826 | 7/1995 | Rieder ..................................... | 375/371 |

Primary Examiner—Douglas W. Olms
Assistant Examiner—Chau T. Nguyen
Attorney, Agent, or Firm—Antonelli, Terry, Stout & Kraus

[57] ABSTRACT

Bus clock generation circuits divide an output of an oscillation circuit with respect to frequency and output phase state signals. A synchronization circuit judges a setup condition on a second bus on the basis of the phase state signals and, when judging the satisfied setup condition, outputs a shift request signal to a CLK2 generation circuit. This causes the CLK2 generation circuit to change a phase of a clock CLK2 in such a manner that data transmission ends always within one period of the clock CLK2, thus a reducing synchronization overhead.

9 Claims, 19 Drawing Sheets

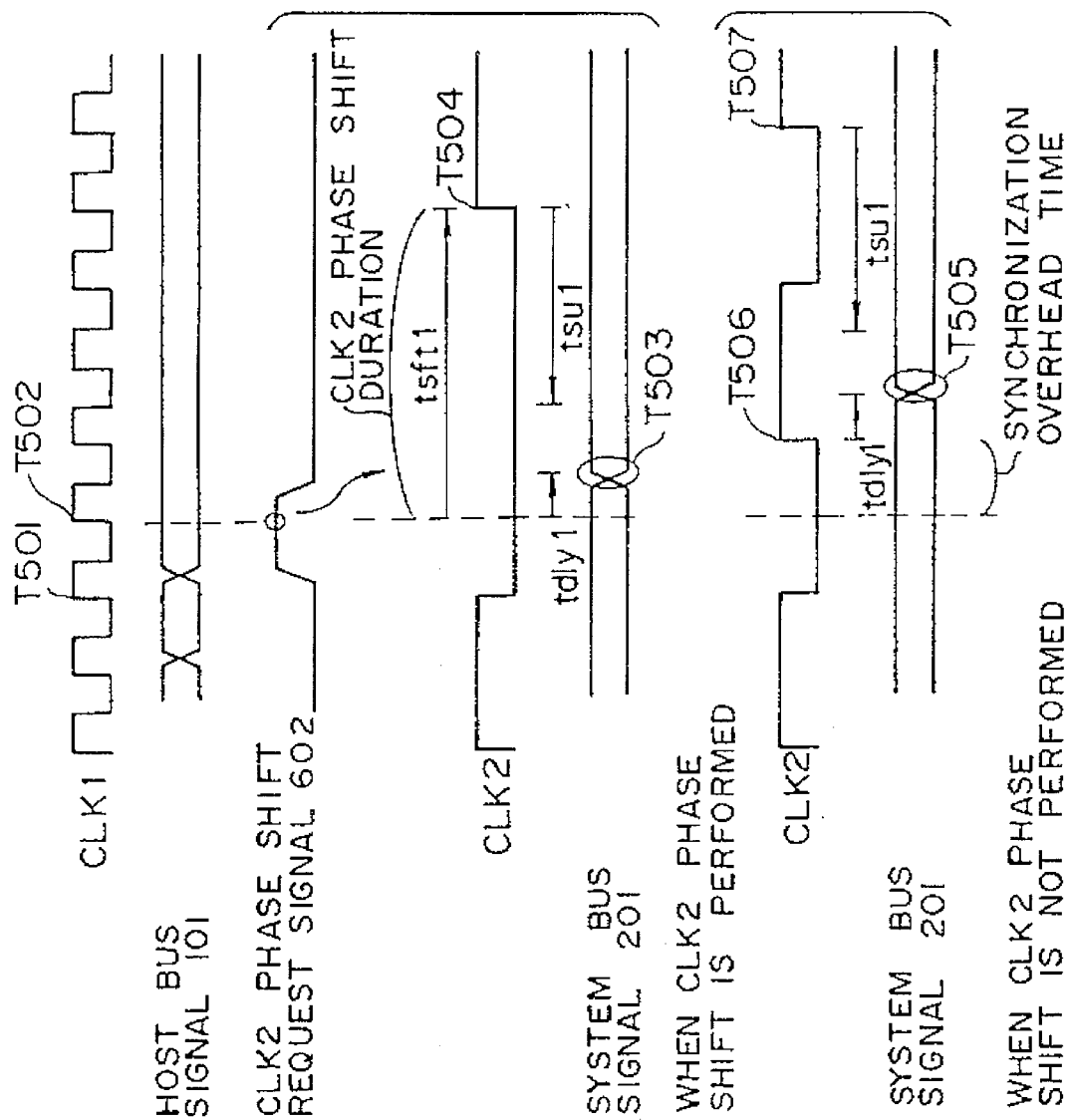

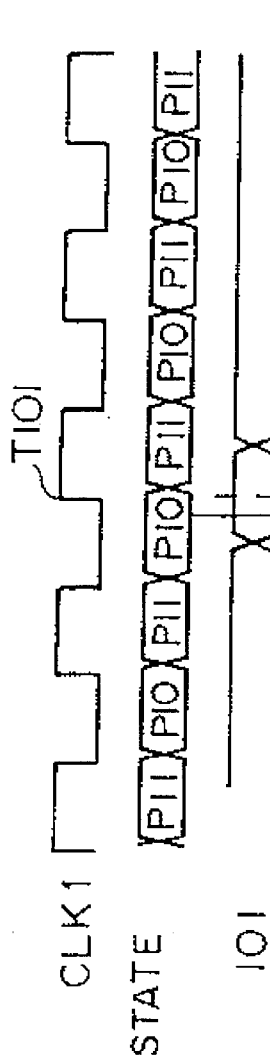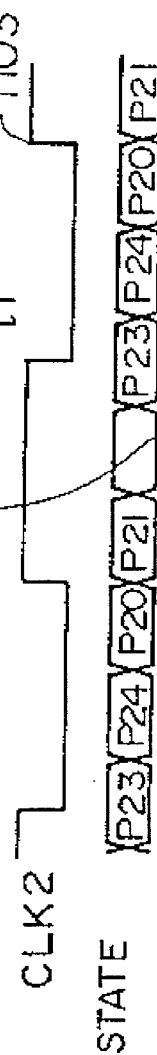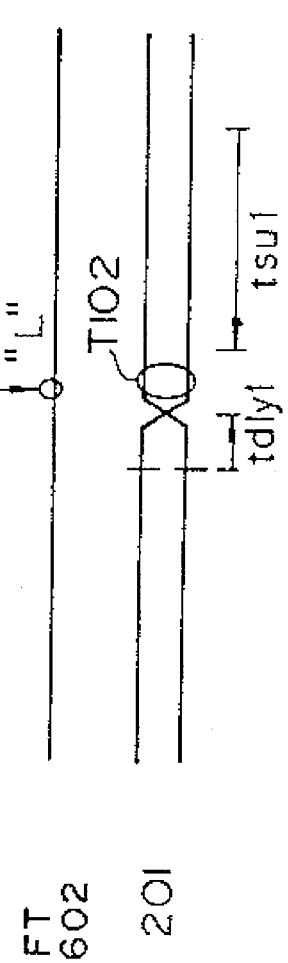

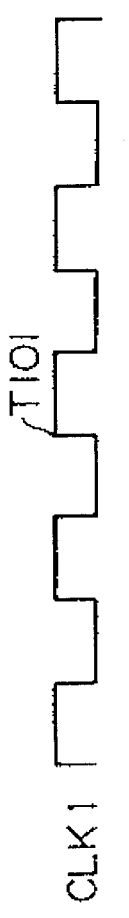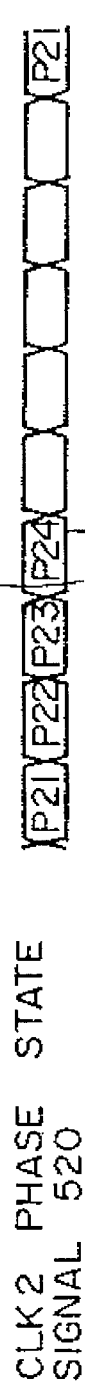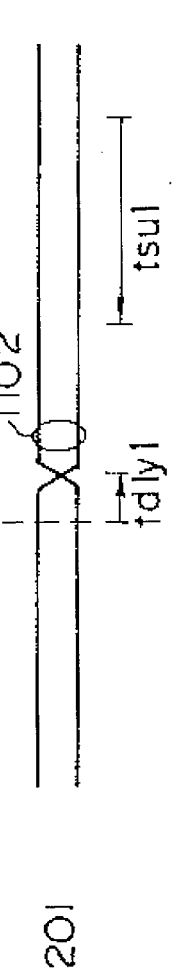

FIG. 7A HOST BUS CLOCK CLK1
FIG. 7B FRAME#
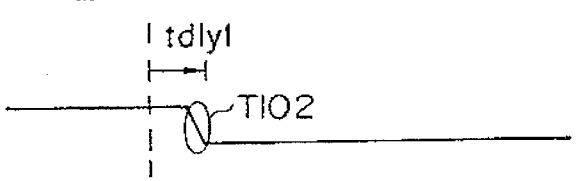
FIG. 7C
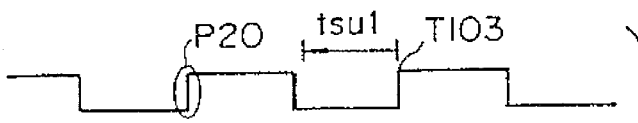
FIG. 7D
FIG. 7E PCI BUS CLOCK CLK2
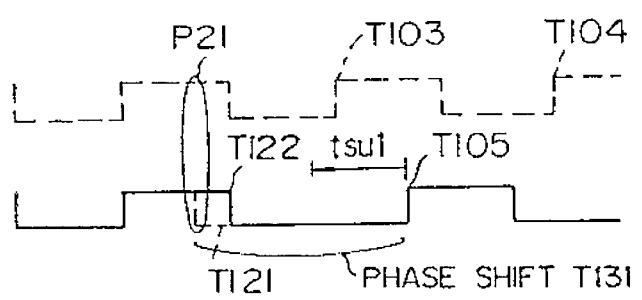
FIG. 7F
FIG. 7G
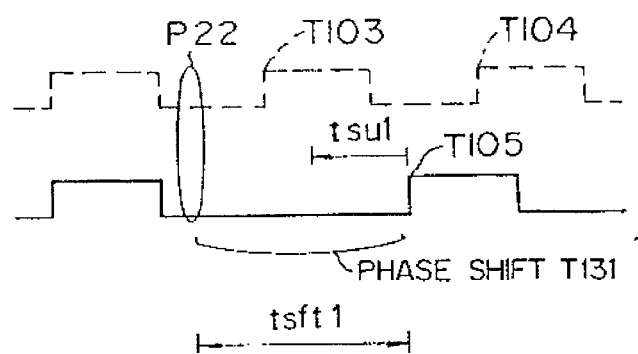

FIG. 9A HOST BUS CLOCK CLK1
FIG. 9B ADS#
FIG. 9C CLK1 PHASE STATE SIGNAL 512
FIG. 9D RDY#
FIG. 9E PCI BUS CLOCK CLK2
FIG. 9F CLK2 PHASE STATE SIGNAL 522
FIG. 9G FRAME#
FIG. 9H IRDY#
FIG. 9I TRDY#

FIG. IIA  INTERNAL HIGH-SPEED CLOCK 901
FIG. IIB  CLK2
FIG. IIC  CLK2 PHASE STATE SIGNAL 521
FIG. IID  CLK2 PHASE STATE SIGNAL 522

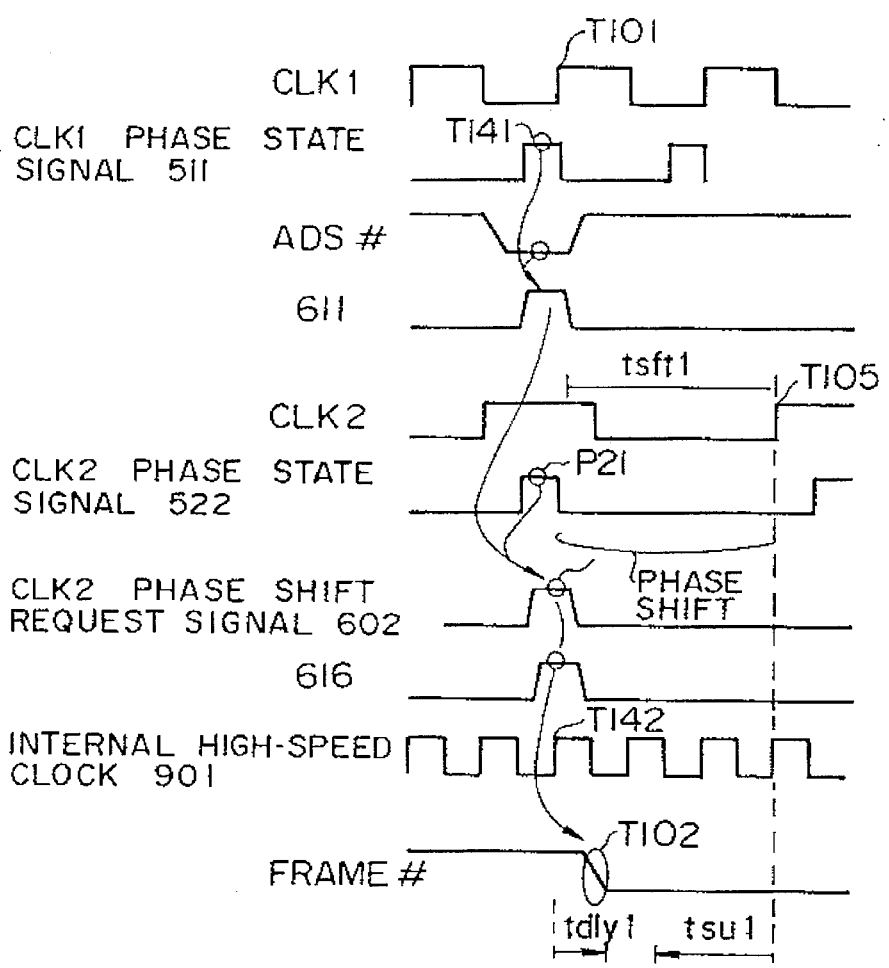

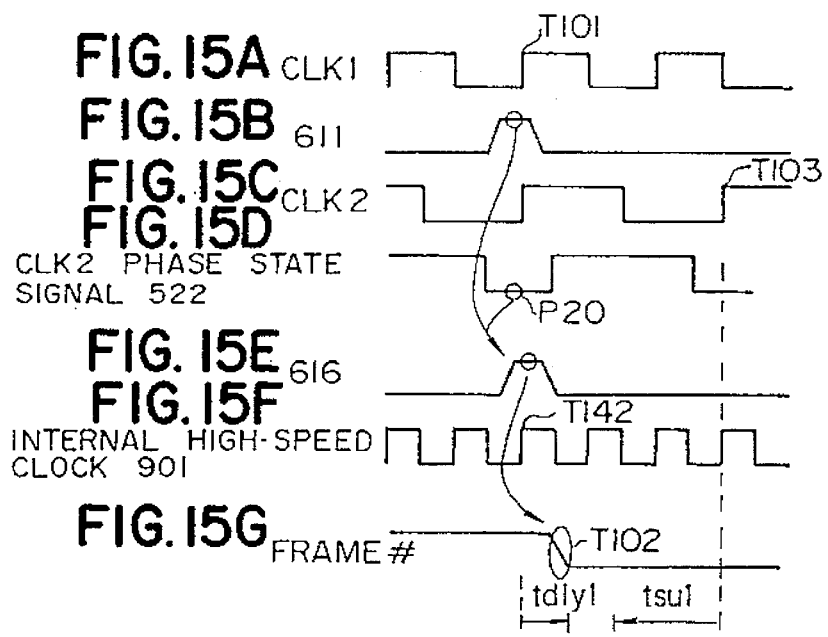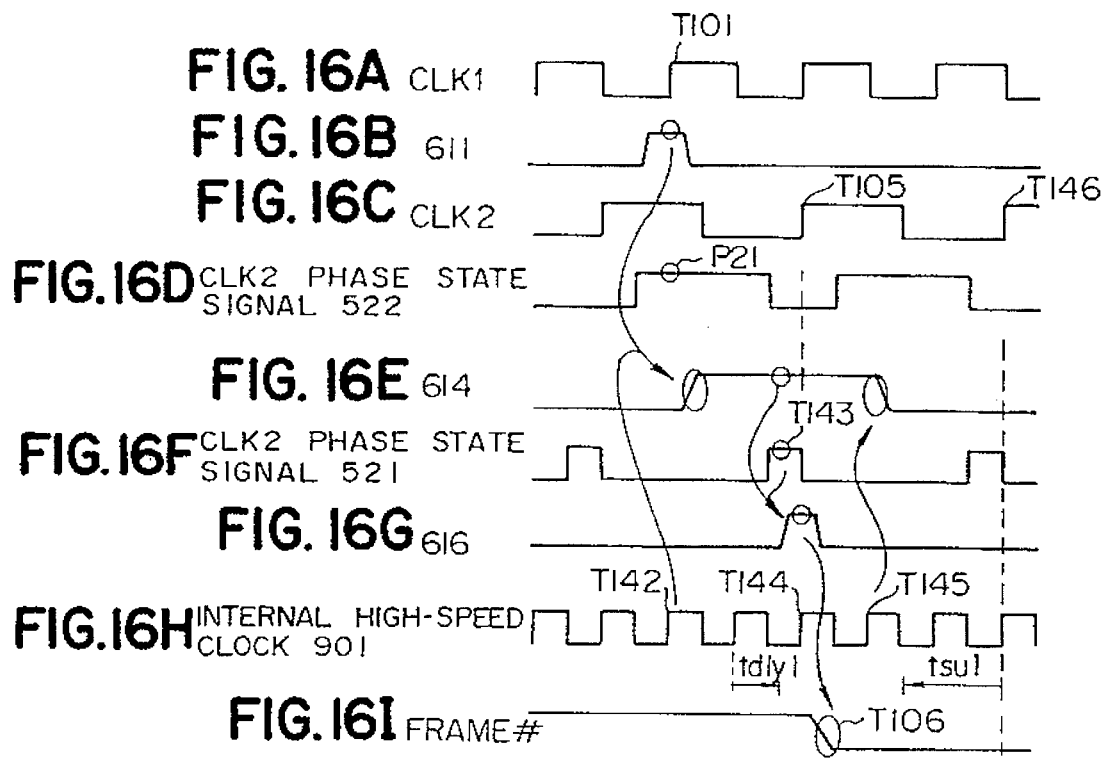

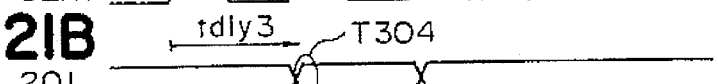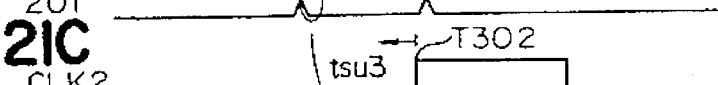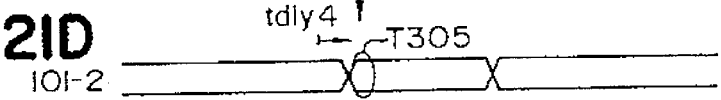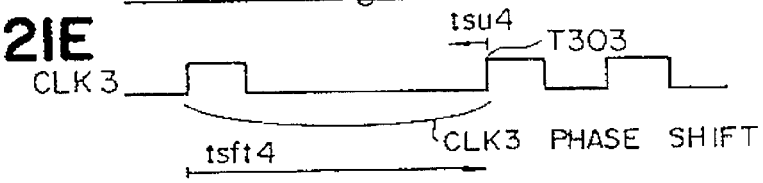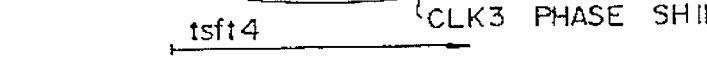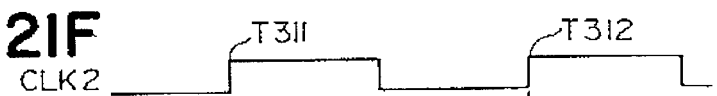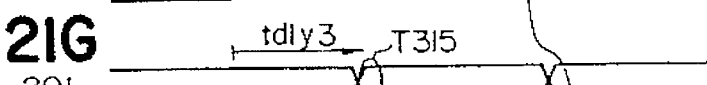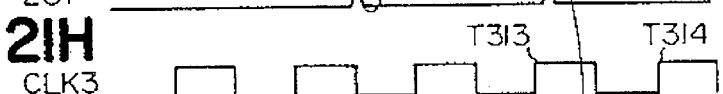

BUS SYNCHRONIZING METHOD AND SYSTEM BASED THEREON

BACKGROUND OF THE INVENTION

1. Field of the Invention

The present invention relates to an electronic circuit including a bus and more particularly, to a method and system for establishing synchronization of data transfer between buses having different operating frequencies.

2. Description of the Related Art

In general, an information processor such as a personal computer or workstation has a hierarchical bus structure such that different buses have different data transmission rates and operating frequencies. For example, a host bus connected to a CPU, cache memory or main memory has the highest data transmission rate. The system bus having the second highest data transmission rate is connected to an I/O interface such as a CRT display interface or a hard disk interface.

The higher the operating frequency of a bus is, the more the bus is influenced by an electrical load such as wiring capacitance or parasitic capacitance, which disadvantageously leads to the fact that the amount of electronic equipment to be connected to the bus must be limited and also the bus manufacturing cost is increased. When the bus employs a hierarchical structure, the cost of the associated information processor can be reduced. However, realization of the above hierarchical structure requires a technique that enables transfer of bus signals including control and data signals between buses having different operating frequencies. To this end, for the purpose of normally transmitting the bus signals to the other bus in data transfer between synchronous buses, timing conversion is carried out therebetween so that a time in which data can be made electrically valid, i.e., a setup time, is satisfied on the respective buses. Such operation is referred to as "bus synchronization".

In general, further, the timing of sampling a bus signal is different between buses having different operating frequencies, and therefore bus synchronization causes an additional waiting time. The waiting time, which is known as "synchronization overhead", increases the time necessary for transmission of signals between the buses, which results in reduction in data transmission performance between the buses. For this reason, reduction of the synchronization overhead is demanded in the bus synchronization.

FIG. 2 is a block diagram of an example of an information processor based on a prior art bus synchronizing system, which includes a host bus 100 operated in synchronism with a clock CLK1 having an operating frequency f1 and a system bus 200 operated in synchronism with a clock CLK2 having an operating frequency f2.

In the drawing, the clock CLK1, which is issued from an oscillator (OSC) 80, is divided by a frequency divider 50 having a frequency division ratio N (natural number) to generate the clock CLK2. The operating frequency f1 of the clock CLK1 and the operating frequency f2 of the clock CLK2 have a relationship of f2=f1/N.

A CPU 10 is connected to the host bus 100 and an I/O interface 20 is connected to the system bus 200 so that signal transmission between the CPU 10 and the I/O interface 20 is carried out through a bus synchronizing circuit 60 which in turn is operated by the clock CLK1.

An example of the prior art bus synchronizing system will be explained in connection with FIG. 3. In this case, the frequency division ratio N is set at 4. When it is desired to transfer data from the host bus 100 to the system bus 200, timing conversion is carried out to prevent unstable data transfer, which is called "synchronization". The I/O interface 20 receives a system bus signal 201 in synchronism with a rising edge of the clock CLK2. For normal data transmission, only passage of at least a setup time tsu1 after a change in the system bus signal allows the I/O interface 20 to take in the system bus signal 201.

An explanation is offered next regarding how to shift the phase of the clock CLK2 in order to remove the synchronization overhead. When a host bus signal 101 output from the CPU 10 becomes valid at the time T501, the bus synchronizing circuit 60 asserts a phase shift request signal 602 associated with the clock CLK2 (that is, puts the phase shift request signal 602 in its active level H). At the time T502 of the first rising edge of the clock CLK1 after the above assertion, the bus synchronizing circuit 60 outputs the system bus signal 201. In this case, the circuit delay causes the system bus signal 201 to change at the time T503 corresponding to a time tdly1 after the time T502. Further, the frequency divider 50 phase-shifts the clock CLK2 from the time T502 to shift the clock CLK2 from its L level to H level at the time T504 after a predetermined time tsft1. The predetermined time tsft1 may be a natural number multiple of the period of the clock CLK1.

When the clock CLK2 shifts from its L level to H level at the time T504, the setup time tsu1 from the time T503 is satisfied, so that the I/O interface 20 can normally sample the system bus signal 201.

An explanation will then be made regarding a case where such a phase shift as mentioned above is not carried out. When such phase shift of the clock CLK2 as mentioned above is not effected, the bus synchronizing circuit 60 waits for the first rising edge time point T506 of the clock CLK2 after the time point T502, outputs the system bus signal 201, and then the I/O interface 20 samples the system bus signal 201 at the time T507. A time duration between the time T502 and T506 is a waiting time given for the synchronization, i.e., synchronization overhead.

In this way, there is known a bus synchronizing system that the time T504 at which the clock CLK2 rises is always given after the predetermined time tsft1, regardless of the phase state at the time of starting the bus synchronization, whereby the necessary setup time tsu1 is satisfied and the synchronization overhead is reduced. Electronic circuits for realizing such a synchronizing system includes a chip set 82350DT (a trademark, manufactured by Intel Corporation, U.S.A.) for performing host bus/EISA bus conversion. For details of the chip set, refer to a data book (82350DT EISA CHIP SET, Order Number: 290377-003) issued from Intel Corporation, U.S.A.

In the aforementioned prior art bus synchronizing system, since the clock CLK1 of the frequency f1 is frequency-divided to generate the clock CLK2 of the frequency f2, the frequency f2 of the clock CLK2 is lower than the frequency f1. For this reason, when it is desired to transmit a signal from the bus having the low operating frequency f2 to the bus having the high operating frequency f1, the phase shift of the clock CLK1 also affects the clock CLK2. Therefore, it is impossible to perform such phase shifting operation as mentioned above over the clock CLK1 and thus it is impossible to shorten the synchronization overhead.

Further, the phase shift is always carried out over the clock CLK2, so that, regardless of the fact that the setup time is sufficiently satisfied until the next rising edge, that is, the phase shift becomes unnecessary depending on a phase relationship between the clocks CLK1 and CLK2, the phase shift is carried out and the corresponding synchronization overhead is generated.

Furthermore, since a relationship of f2=f1/N (N: natural number) is satisfied between the frequency f1 of the clock CLK1 and the frequency f2 of the clock CLK2, combinations of these frequencies f1 and f2 are limited.

SUMMARY OF THE INVENTION

It is accordingly an object of the present invention to provide a bus synchronizing method which can solve the above problems in the prior art and can reduce the synchronization overhead even when frequencies f1 and f2 of clocks for buses are set to have a natural number ratio therebetween, and also to provide a system based on the bus synchronizing method.

A second object of the present invention is to provide a bus synchronizing method in an information processor including 2 or more buses having mutually different operating frequencies, in which upper operating frequencies of the respective buses are used to reduce a synchronization overhead while eliminating the need for being limited to the operating frequency of a unit such as a CPU connected to one of the buses.

A third object of the present invention is to provide a bus synchronizing method in an information processor including at least 2 or more buses having mutually different operating frequencies, which enables reduction of physical quantities of an oscillating element or circuit, and also to provide a system based on the bus synchronizing method.

A fourth object of the present invention is to provide a circuit configuration which can be suitably made in the form of an integrated circuit based on the above bus synchronizing method.

A fifth object of the present invention is to provide a bus synchronizing method which can realize reduction of a synchronization overhead even for transfer of bus signals through a plurality of buses.

In accordance with an aspect of the present invention, the above first and second objects are attained by comparing a phase state of a first clock with a phase state of a second clock and controlling either one of the phases of the first and second clocks on the basis of the comparison result.

In more detail, the present invention comprises a first bus operated in synchronism with a first clock CLK1, a second bus operated in synchronism with a second clock CLK2, CLK1 generation means for out-putting the first clock CLK1 and a phase state signal of the first clock, clock CLK2 generation means for outputting a second clock CLK2 and a phase state signal of the second clock, bus synchronization means for establishing synchronization between signals of the first and second buses and for comparing the phase state signal of the clock CLK1 with the phase state signal of the clock CLK2, and means for performing phase modulation over the clock CLK2 according to the comparison result of the bus synchronization means being provided in the CLK2 generation means.

In order to realize reduction of such physical quantity as an oscillation element or circuit as set forth in the third object of the present invention or in order to attain a circuit configuration suitable for making the bus synchronizing system in the form of an integrated circuit as set forth in the fourth object of the present invention, in addition to the above arrangement, there are provided reference clock generation means and a PLL (phase locked loop) circuit for frequency-multiplying a reference clock to generate a signal having a frequency corresponding to a common multiple of the frequencies of the first and second clocks CLK1 and CLK2 and reference clock.

In order to realize reduction of a physical quantity such as an oscillation element or circuit as set forth in the third object of the present invention or in order to attain a circuit configuration suitable for making the synchronizing system as set forth in the fourth object of the present invention, in addition to the above arrangement, there is provided a PLL circuit which frequency-multiplies the clock CLK1 to generate a signal having a frequency corresponding to a common multiple of the frequencies of the clocks CLK1 and CLK2.

In order to attain the fifth object, in the present invention, there is provided such an arrangement that a bus signal is transmitted through a plurality of buses. For example, when a first bus operated in synchronism with a first clock CLK1, a second bus operated in synchronism with a second clock CLK2 and a third bus operated in synchronism with a third clock CLK3 are provided and when it is desired to transmit a bus signal from the first bus via the second bus to the third bus, there are provided, in addition to the first to third buses, CLK1 generation means for outputting a CLK1 phase state signal a; CLK2 generation means for outputting a CLK2 phase state signal; CLK3 generation means; CLK3 phase state signal generation means; first bus synchronization means for establishing synchronism between first and second bus signals to compare the CLK1 phase state signal, the CLK2 phase state signal and the CLK3 phase state signal; second bus synchronization means for establishing synchronism between the second and third bus signals; means for performing phase modulation over the clock CLK2 on the basis of the comparison result being provided in the CLK2 generation means; and means for performing phase modulation over the clock CLK3 being provided in the CLK3 generation means on the basis of the comparison result.

Since a phase relationship between the first and second clocks can be detected by comparing the two phase state signals at the time of the synchronization, the phase of the second clock can be controlled.

A frequency ratio between the two clocks is determined by a frequency division ratio set by the CLK1 and CLK2 generation means. When signal transmission is carried out from the first bus to the second bus, the bus synchronization means compares the CLK1 phase state signal with the CLK2 phase state signal and the CLK2 generation means performs phase modulation over the clock CLK2 on the basis of the comparison result of the bus synchronization means, whereby the sampling time point of the signal is shifted to reduce a synchronization overhead while satisfying a setup time on the second bus.

With the arrangement having the PLL circuit added, the PLL circuit frequency-multiplies the reference clock to generate an internal high-speed clock having a frequency corresponding to a common multiple of the clocks CLK1 and CLK2 and the reference clock. The CLK1 generation circuit divides the internal high-speed clock with respect to frequency to generate the clock CLK1 and the CLK1 phase state signal. The CLK2 generation circuit divides the internal high-speed clock with respect to frequency to generate the clock CLK2 and the CLK2 phase state signal.

In the information processor based on the bus synchronizing system of the present invention, the aforementioned operation causes a single reference clock generation circuit to generate a plurality of bus clocks. Further, even when the plurality of buses within the information processor are operated on respective upper limit operating frequencies, the synchronization overhead can be reduced so long as a frequency ratio between the bus clocks is set to be a natural number.

In the integrated circuit using the bus synchronizing system of the present invention, the PLL circuit provided within the integrated circuit generates a clock higher than the reference clock externally supplied through the above operation or the clock CLK1.

BRIEF DESCRIPTION OF THE DRAWINGS

FIG. 3 is a timing chart for explaining the prior art bus synchronizing system of FIG. 2;

FIG. 4 is a timing chart for explaining an example of the operation of the information processor of FIG. 1;

FIG. 5 is a timing chart for explaining another example of the operation of the information processor of FIG. 1;

FIG. 7 is a timing chart for explaining an example of the operation of the information processor of FIG. 6;

FIG. 14 is a timing chart for explaining an example of the operation of the frame# generation circuit of FIG. 13;

FIG. 15 is a timing chart for explaining another example of the operation of the frame# generation circuit of FIG. 13;

FIG. 16 is a timing chart for explaining yet another example of the operation of the frame# generation circuit of FIG. 13;

FIG. 21 is a timing chart for explaining the operation of the embodiment of FIG. 20.

DESCRIPTION OF THE PREFERRED EMBODIMENTS

Embodiments of the present invention will be detailed with reference to the accompanying drawings.

Figure 1:
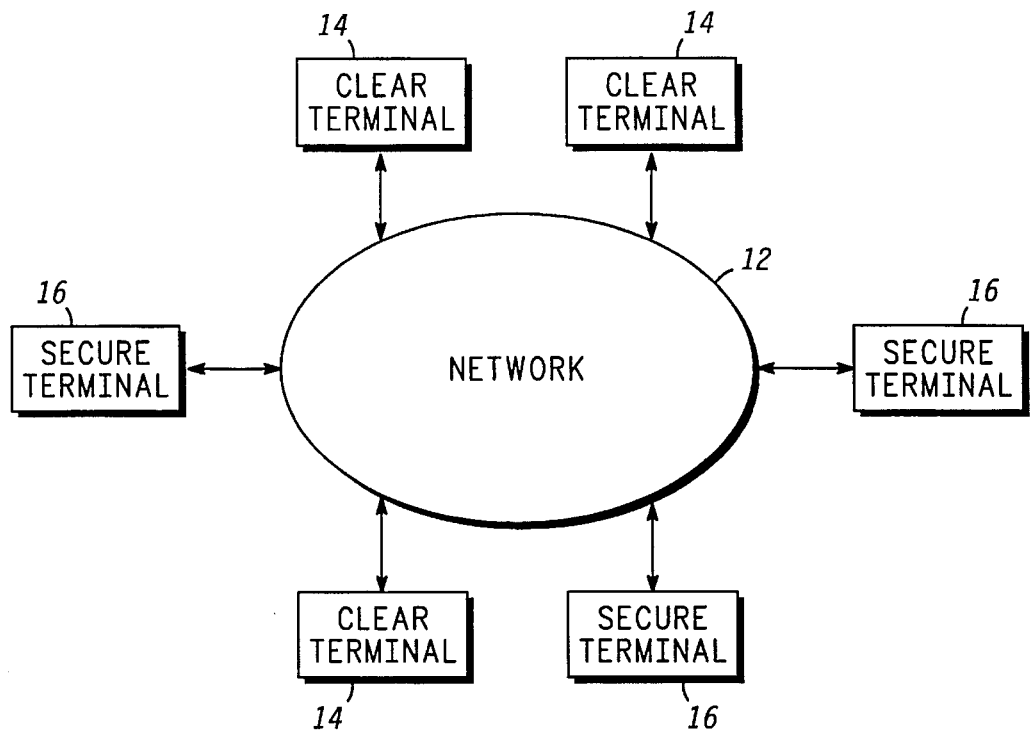
FIG. 1 is a block diagram of an information processor of a bus synchronizing system of a first embodiment according to the present invention.
Figure 2:
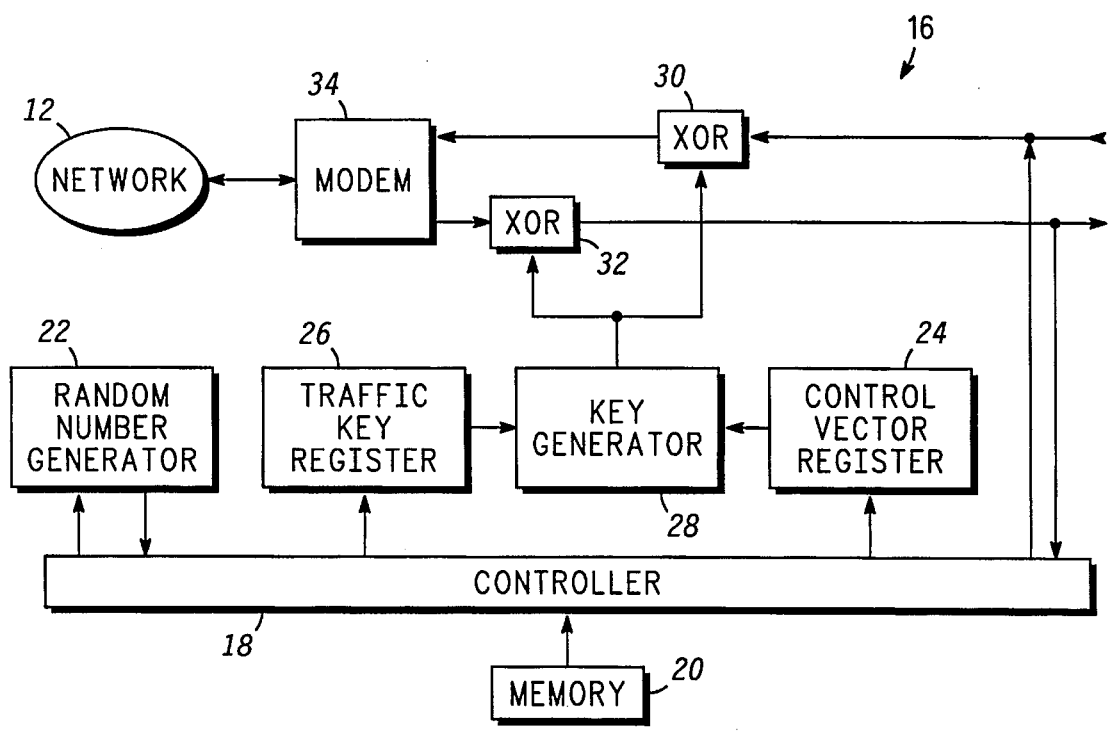
FIG. 2 is a block diagram of an information processor based on a prior art bus synchronizing system.

Referring first to FIG. 1, there is shown a block diagram of an information processor based on a bus synchronizing system in accordance with a first embodiment of the present invention, which includes a host bus 100 operated in synchronism with a clock CLK1 having a frequency f1, a system bus 200 operated in synchronism with a clock CLK2 having a frequency f2, a CPU 10, an I/O interface 20, a CLK1 generation circuit 51, a CLK2 generation circuit 52, a bus synchronization circuit 60, and a crystal oscillator 80.

FIGS. 4 and 5 are timing charts for explaining the operation of the first embodiment, in which a time due to a circuit delay during transmission of a system bus signal 201 in FIG. 1 is denoted by reference symbol tdly1 and a setup time on the system bus 200 is denoted by symbol tsu1.

The operation of this embodiment will be explained in connection with FIGS. 4 and 5. A reference clock 801 issued from the crystal oscillator 80 is supplied to the CLK1 generation circuit 51, and subjected to a 2 dividing operation to obtain the clock CLK1 having the frequency f1 and a CLK1 phase state signal 510 indicative of phase states (P10 and P11) of the clock CLK1. The reference clock 801 is also supplied to the CLK2 generation circuit 52, and subjected to a 5 dividing operation to obtain the clock CLK2 having the frequency f2 and a CLK2 phase state signal 520 indicative of phase states (P20, P21, P22, P23 and P24) of the clock CLK2. In the illustrated example, a ratio between the frequency f1 of the clock CLK1 and the frequency f2 of the clock CLK2 is set to be 2:5.

The CLK1 phase state signal 510 and CLK2 phase state signal 520 are both generated from the reference clock 801. The phase state is defined by the clocks CLK1 and CLK2 and the frequency ratio of the reference clock. Since the clock CLK1 is obtained by subjecting the reference clock to the 2 dividing operation, the phase states are repeated as 0, 1, 0, 1, . . . In this case, such states are expressed by P10 and P11 respectively. On the other hand, since the clock CLK2 is obtained by subjecting the reference clock to the 5 dividing operation, the phase states are repeated as 0, 1, 2, 3, 4, 0, 1, 2, 3, 4, . . . In this case, such states are expressed by P20, P21, P22, P23 and P24.

Explanation will then be made as to the synchronization when a signal is sent from the CPU 10 to the I/O interface 20. The CPU 10, when receiving the clock CLK1 from the CLK1 generation circuit 51, are operated and sends a signal to be sent to the I/O interface 20 as the host bus signal 101 via the host bus 100 to the bus synchronization circuit 60. The I/O interface 20, when receiving the clock CLK2 from the CLK2 generation circuit 52, is operated.

The CLK1 phase state signal 510 generated at the CLK1 generation circuit 51 as well as the CLK2 phase state signal 520 generated at the CLK2 generation circuit 52 are supplied to the bus synchronization circuit 60, which in turn outputs the system bus signal 201 at a time point T101 at which the host bus signal 101 becomes valid. The system bus signal 201 becomes valid at the time T102 after the time tdly1 caused by the circuit delay.

The bus synchronization circuit 60 compares the CLK1 phase state signal 510 with the CLK2 phase state signal 520 at the time T101 and outputs to the CLK2 generation circuit 52 a phase shift request signal 602 associated with the clock CLK2 according to phase shift conditions shown in Table 1 below.

TABLE 1

| CLK1 | CLK2 | Signal 602 | CLK1 | CLK2 | Signal 602 |
|---|---|---|---|---|---|
| phase state | phase state | signal level | phase state | phase state | signal level |
| P10 | P20 | L | P11 | P20 | L |
| P10 | P21 | L | P11 | P21 | L |
| P10 | P22 | H | P11 | P22 | L |
| P10 | P23 | H | P11 | P23 | L |
| P10 | P24 | H | P11 | P24 | L |

The phase shift conditions given in Table 1 are determined by the times tdly1 and tsu1 and by the phase states (P10, . . . , P11, P21, . . . , and P24) of the clocks CLK1 and CLK2.

Since the host bus 100 is operated in synchronism with a rising edge of the clock CLK1, the CLK1-associated phase state P10 conditions become necessary. Meanwhile, the system bus 200 is operated in synchronism with a rising edge of the clock CLK2, the phase shift must be performed in accordance with the following relationship, with the assumption that a time from the time point T101 to a time T103 of the next rising edge of the clock CLK2 is denoted by reference symbol t1 and a setup time on the system bus 200 is denoted by symbol tsu1.

$$t1 < tdly + tsu1$$

where the values of tdly and tsu1 are previously measured and known. According to the condition relationship, the setup conditions are not met when the CLK2-associated phase states at the time T101 are P22, P23 and P24, so that the phase shift of the clock CLK2 becomes necessary. In other words, when the phase states of the clocks CLK1 and CLK2 are P10 and P22, P10 and P23, or P10 and P24, the phase shift of the clock CLK2 is carried out.

Shown in FIG. 4 is a case where, at the time T101 at which the host bus signal 101 becomes valid, the CLK1 phase state signal 510 is P10 and the CLK2 phase state signal 520 is P21. Under this condition, the phase shift request signal 602 associated with the clock CLK2 is at its inactive L level. At this time, since the setup time tsu1 is satisfied at the time T103 corresponding to the first rising edge of the clock CLK2 after the time T101, the system bus signal 200 is normally taken in by the I/O interface 20.

FIG. 5 shows a case where the CLK1 phase state signal 510 is P10 and the CLK2 phase state signal 520 is P24 at the time T101. Under this condition, the phase shift request signal 602 associated with the clock CLK2 is at its active H level. At this time, the CLK2 generation circuit 52 changes the clock CLK2 from its L level to H level at the time T105 after passage of a predetermined time tsft1 (>tdly1+tsu1) from the time T101. In the illustrated example, the setup time tsu1 corresponds to one period of the clock CLK2. It is desirable that the predetermined time tsft1 satisfy the above condition relationship and be as small as possible. Since the setup time tsu1 is satisfied at the time point T105 of the clock CLK2, the system bus signal 200 is normally taken in by the I/O interface 20. Further, in place of the phase shift, a delay circuit may be used to cause the clock CLK2 to satisfy the above condition relationship.

As has been explained above, in the present embodiment, the frequency ratio between the 2 bus clocks CLK1 and CLK2 is determined by frequency division ratios set respectively in the CLK1 and CLK2 generation circuits 51 and 52. Further, regardless of a phase relationship between the bus clocks CLK1 and CLK2 at the time point T101, the necessary setup time tsu1 can be always satisfied. For this reason, data transfer can be carried out between the buses having the frequency ratio of an arbitrary natural number between the two bus clocks CLK1 and CLK2.

In the present embodiment, further, the CLK1 phase state signal 510 is compared with the CLK2 phase state signal 520 at the time T101 so that, only when the setup conditions on the system bus 200 are not satisfied, the phase shift of the clock CLK2 is carried out. Thus, the present embodiment can shorten its synchronization overhead when compared to that of the above prior art bus synchronizing system in which phase shift is carried out at all times regardless of phase state.

Only the natural number N has been used as the frequency ratio f1/f2 in the above described prior art. However, in the present embodiment, a non-natural number may be employed for the frequency ratio f1/f2 or, even when f2>f1 and f2/f1 is a non-natural number as shown in FIGS. 4 and 5, a synchronization overhead can be similarly reduced.

Such phase shift rules as shown in the above Table 1 are stored in the bus synchronization circuit 60 in such a form as implementable by a logic circuit, i.e., in the form of a phase state table.

Figure 22:
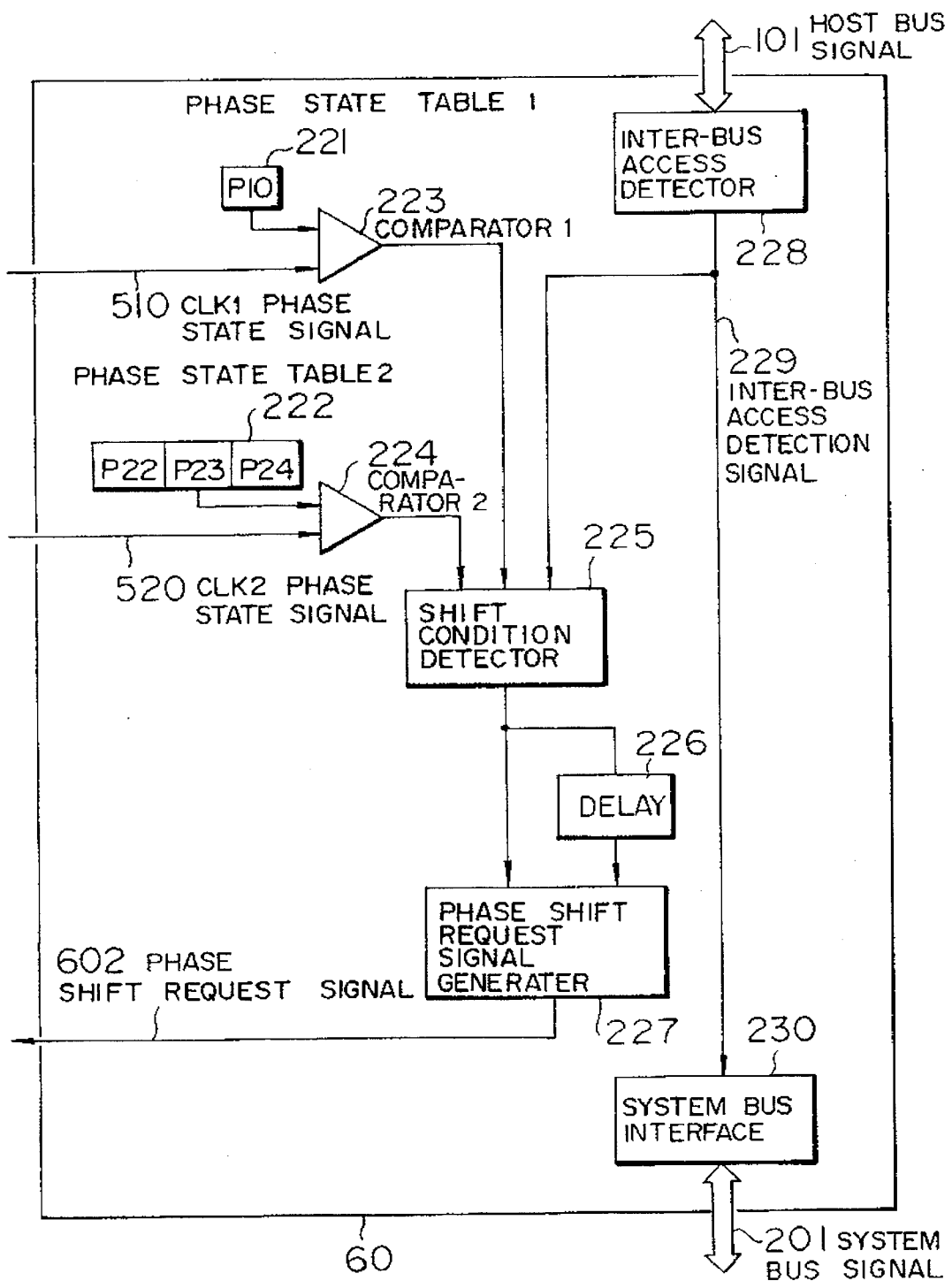
FIG. 22 is an arrangement of a bus synchronization circuit in accordance with the present invention.

FIG. 22 shows an arrangement of a bus synchronization circuit. More specifically a comparator 223 compares the CLK1 phase state signal 510 issued from the CLK1 generation circuit 51 with a phase state set in a phase state table 221. In FIG. 22, the comparator 223 finds a coincidence of the CLK1 phase state signal 510 with a phase state P10. A comparator 224 compares the CLK2 phase state signal 520 issued from the CLK2 generation circuit 52 with a phase state set in a phase state table 222. In FIG. 22, the comparator 224 finds a coincidence of the CLK1 from among phase state signal 520 with a phase state P22, P23 or P24.

An inter-bus access detector 228 monitors the host bus signal 101 and, when it is desired to transmit a signal from the host bus 100 to the system bus 200, generates a inter-bus access detection signal 229. The inter-bus access detector is operated by the clock CLK1 as its input clock, but it may also be operated by the reference clock 801 as its input clock.

A system bus interface 230, when receiving the inter-bus access detection signal, generates a signal and sends it onto the system bus. The system bus interface may be arranged to be operated by the clock CLK2 as its input clock or by the reference clock 801 as its input clock.

A shift condition detector 225, when finding a coincidence between the CLK1 phase state and the contents of the phase state table 1 and a coincidence between the CLK2 phase state and the contents of the phase state table 2 and detecting an inter-bus access (i.e. when receiving the inter-bus access detection signal 229 from the inter-bus access detector 228), detects that the shift conditions were satisfied.

A phase shift request signal generator 227, on the basis of a detection result of the shift condition detector 225, generates the phase shift request signal 602. When the shift conditions are satisfied and the phase shift request signal generator 227 issues the phase shift request, the phase shift request signal generator 227 releases the phase shift request after a delay time defined by a delay circuit. The delay may be arranged to be operated by the clock CLK2 as its input clock or by the reference clock 801 as its input clock.

Figure 6:
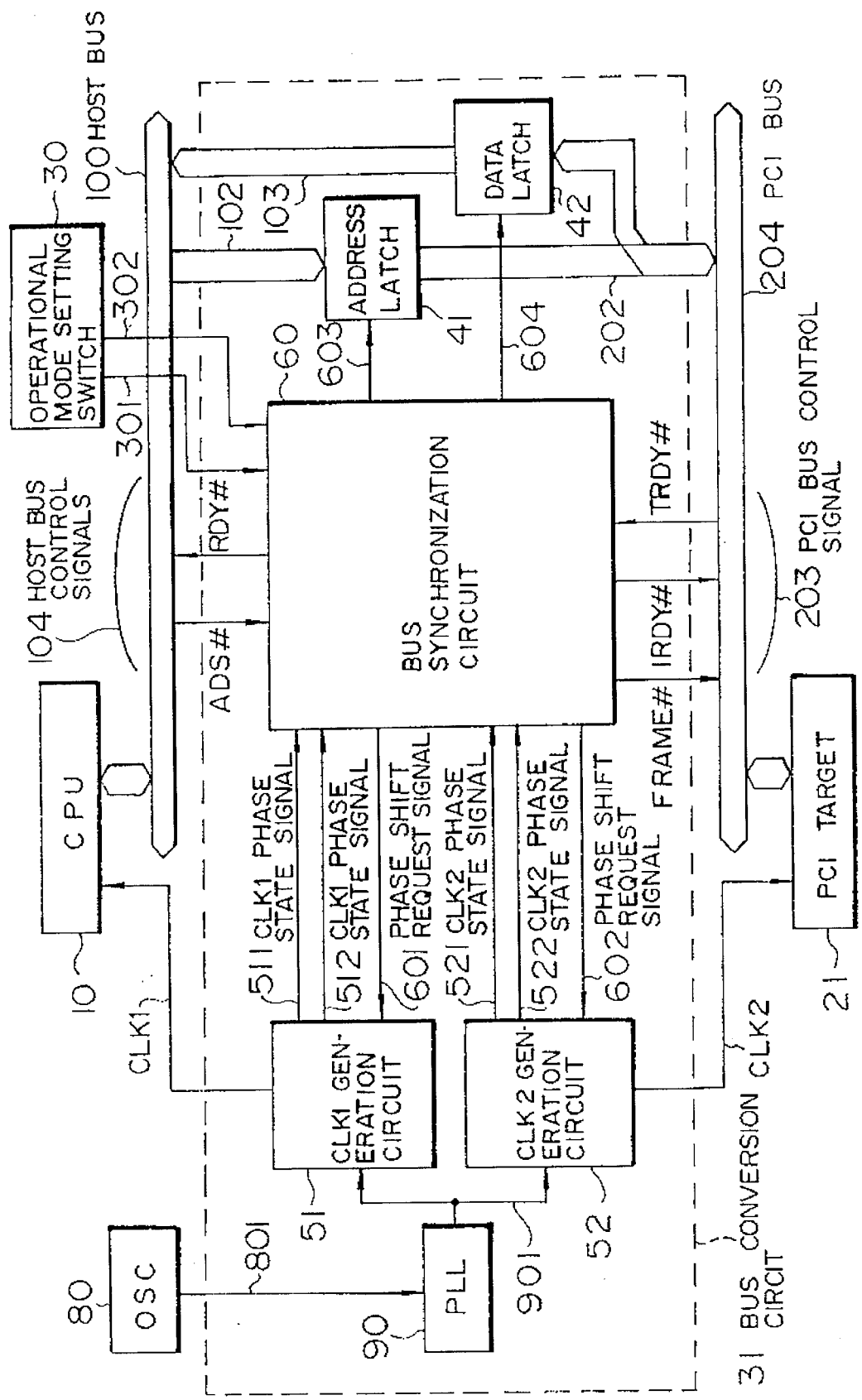
FIG. 6 is a block diagram of an information processor of a bus synchronizing system in accordance with a second embodiment of the present invention.

Turning to FIG. 6, there is shown a block diagram of an information processor of a bus synchronizing system in accordance with a second embodiment of the present invention, which includes a PCI bus 204 as a system bus, a PCI target 21 such as a disk controller or the like, a bus conversion circuit 31 for the host and PCI buses, an operational mode setting switch 30 for externally determining the operational mode of the bus conversion circuit 31, an address latch 41, a data latch 42, a crystal oscillator 80, a phase locked loop (PPL) circuit 90, and wherein parts corresponding to those in FIG. 1 are denoted by the same reference numerals and symbols.

The PCI bus is a local bus specified by a group for standardization (PCI special interest group) with Intel Corporation, U.S.A. taking the lead in it. Details of the PCI bus are described in PCI Local Bus Specifications, Product Edition, Version 2.0.

In FIG. 6, the host bus 100 transmits host bus control signals 104 (ADS# and RDY#), a host address signal 102 and a host data signal 103 therethrough. The PCI bus 204 transmits PCI bus control signals 203 (FRAME#, IRDY# and TRDY#) and a data signal 202 therethrough. The bus conversion circuit 31 comprises the PPL circuit 90, the CLK1 generation circuit 51, the CLK2 generation circuit 52, the address latch 41, the data latch 42, and the bus synchronization circuit 60. An address latch control signal 603 controls the latch timing or output enable of the address latch 41. A data latch control signal 604 controls the latch timing or output enable of the data latch 42.

In the illustrated example, data are moved in both ways between the host bus 100 and PCI bus 204 and both of the clocks CLK1 and CLK2 are subjected to phase shifting operation. The bus conversion circuit 31 converts a read cycle sent from the CPU 10 onto the host bus 100 into a bus cycle on the PCI bus 204. In one bus cycle, synchronization is carried out twice. In the first synchronization, the host address signal 102 issued from the CPU 10 is received by the address latch 41 which in turn outputs the PCI address/data signal 202. The timing of the PCI address/data signal 202 being received by the PCI target 21 is determined by the bus synchronization circuit 60 with use of the FRAME# signal. In the next synchronization, the PCI address/data signal 202 issued from the PCI target 21 is received by the data latch 42 which, in turns, outputs the host data signal 103. The timing of the host bus data signal 103 being received by the CPU 10 is determined by the bus synchronization circuit 60 with use of the RDY# signal.

An explanation will next be made regarding the bus synchronizing system of the present embodiment in connection with FIGS. 7 and 8. In this case, an internal high-speed clock 901 of 200 MHz issued from the PPL circuit 90 is frequency-divided by 4 by the CLK1 generation circuit 51 to generate the clock CLK1 of 50 MHz, while the internal high-speed clock 901 is frequency-divided by 6 by the CLK2 generation circuit 52 to generate the clock CLK2 of 33.3 . . . MHz, respectively. In the following description, it is assumed that the clocks CLK1 and CLK2 have the above frequencies respectively. Further, the CLK1 generation circuit 51 generates CLK1 phase state signals 511 and 512 indicative of the phase states of the clock CLK1, while the CLK2 generation circuit 52 generates CLK1 phase state signals 521 and 522 indicative of phase states of the clock CLK2, wherein these state signals are all supplied to the bus synchronization circuit 60. The phase state signals 511 and 522 indicate the information of the clocks to be used for data transmission from the host bus to the PCI bus; whereas, the phase state signals 512 and 521 indicate the information of the clocks to be used for data transmission from the PCI bus to the host bus.

FIG. 7 shows synchronization from the host bus 100 to the PCI bus 204. In the illustrated example, a setup time on the PCI bus 204 is also denoted by reference symbol tsu1 and the CLK1 and CLK2 phase state signals 511 and 522 are used so that the bus synchronization circuit 60 generates the phase shift request signal 602 according to a phase relationship between the clocks CLK1 and CLK2 indicated by the phase state signals 511 and 522.

At the time T101, the CPU 10 asserts the ADS# signal to put it in its L level to indicate the start of the read cycle on the host cycle. At the time T101, the host address signal 102 is taken in by the address latch 41. The bus synchronization circuit 60 starts the PCI bus cycle and, at the time T102 after passage of the delay time tdly1, asserts the FRAME# signal from its H level to active L level.

Meanwhile, depending on the CLK2 phase state signal 522, i.e., the phase states (P20, P21 and P22) of the clock CLK2 at the time point T101, CLK2 change-over rules are divided into two cases, that is, "when the phase shift is unnecessary" and "when the phase shift allows the transmission to be carried out at the next rising edge of the clock CLK2".

First of all, the explanation will be directed to when "the phase shift is unnecessary" (phase state of P20). In this case, even when the phase shift is not carried out over the clock CLK2, the setup time tsu1 is passed at the time T103 at which the clock CLK2 rises after the time T102 at which the FRAME# signal becomes its L level. For this reason, the PIC address/data signal 202 issued from the address latch 41 is taken in by the PCI target 21 at the time T103.

Then, when "the phase shift allows the transmission to be carried out at the next rising edge of the clock CLK2" (phase states of P21 and P22), the CLK2 generation circuit 52 performs phase shifting operation T131 so that the time T105, at which the clock CLK2 rises comes the predetermined time tsft1 later corresponding to one period of the clock CLK2 from the time T101. After the time T102 at which the FRAME# signal becomes its L level, since setup time tsu1 is passed at the time T105, the PCI address/data signal 202 issued from the address latch 41 is taken in by the PCI target 21. When the phase shift is carried out over the clock CLK2, it is arranged to satisfy the minimum period of the PCI bus clock and the minimum values of L and H level durations thereof. For example, when the signal level of the clock CLK2 is set to change to its L level at the time T101, as shown by a dotted line T121 in the phase P21, the minimum value of the H level duration of the PCI bus clock cannot be satisfied. Accordingly, its H level duration should be prolonged as shown by a solid line T122.

Explanation will now be made as to how the phase shifting operation T131 enables reduction of the synchronization overhead. When no phase shifting operation is carried out, the time at which data transmission is carried out in the phase states P21 and P22 must satisfy the setup time tsu1 is shown by a dotted line, so that the clock must be set as shown by a dotted line T104. This is because, when the FRAME# signal is asserted by the time point T101, the setup time tsu1 cannot be satisfied at the time T103 of the next rising edge of the clock CLK2, so that the bus synchronization circuit 60 asserts the FRAME# signal after the time T103. Accordingly, in the phase states P21 and P22, the synchronization overhead corresponds to a duration between the time points T101 and T103. In the present embodiment, the phase shift of the clock CLK2 realizes reduction of such a synchronization overhead to zero.

Figure 8:
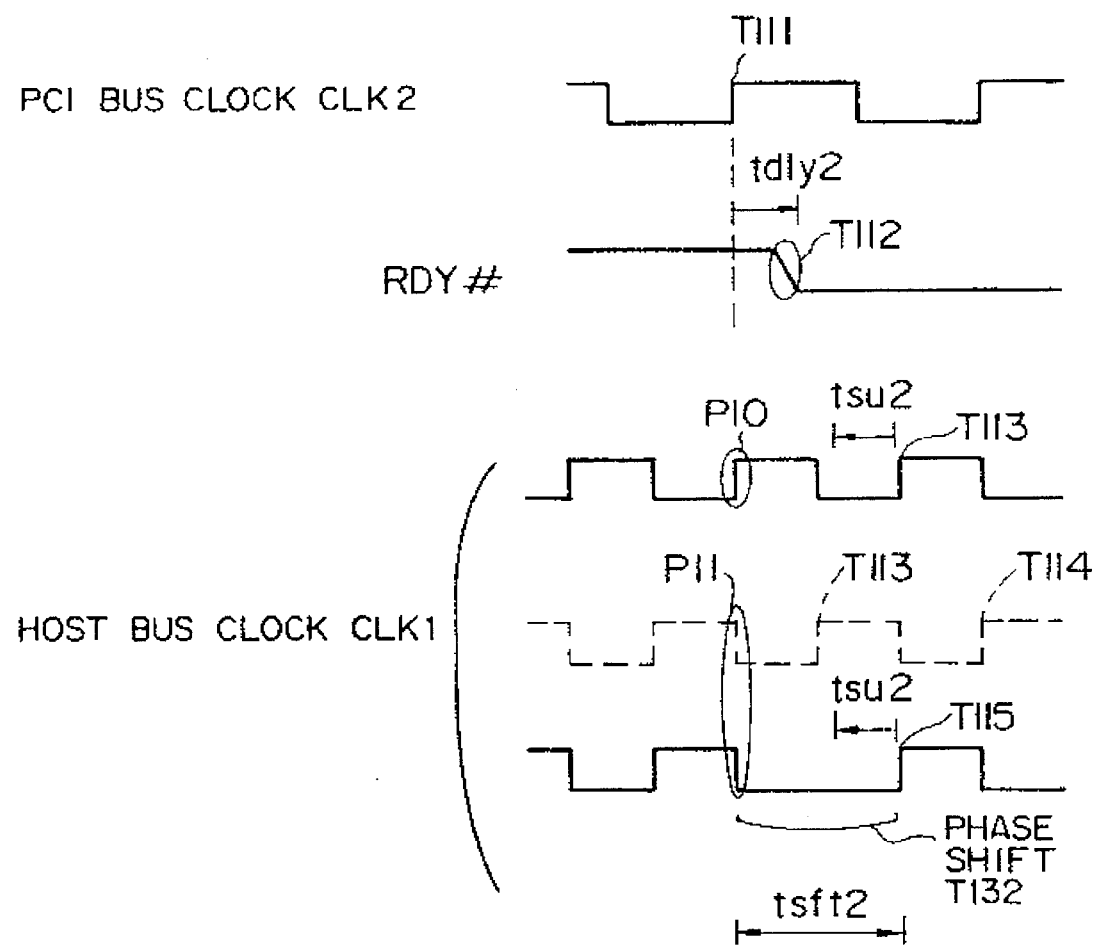
FIG. 8 is a timing chart for explaining another example of the operation of the information processor of FIG. 6.

The explanation will next be directed to how to perform synchronization from the PCI bus 204 to the host bus 100 with reference to FIG. 8. In this connection, it is assumed that a setup time on the host bus 100 is denoted by reference symbol tsu2. In the illustrated example, the CLK1 phase state signal 512 and CLK1 phase state signal 521 are used to generate a phase shift request signal 601 according to a phase relationship between the clocks CLK1 and CLK2. Other operation and arrangements are substantially the same as those of FIG. 7.

When the present embodiment employs a bus synchronizing system, a read cycle on the host bus 100 is converted to a PCI Dus cycle and data on the PCI bus 204 is transferred onto the host bus 100. This series of operations will be explained by referring to a timing chart showing a bus converting operation in FIG. 9.

When the CPU 10 causes the ADS# signal to be put in its active L level at the time point T101, the host address signal 102 issued from the CPU 10 is taken in by the address latch 41.

At this time, since the clock CLK2 has its phase state P21 at the time T101, the phase shift of the clock CLK2 is carried out so that the clock CLK2 rises at the time T105 after the delay time tdly1.

Meanwhile, the PCI target 21 accepts the PCI address/data signal 202 at the time T105 and recognizes the PCI bus cycle. Thereafter, due to the read cycle from the CPU 10, the PCI address/data signal 202 is transmitted from the PCI target 21 to put the TRDY# signal in its active L level. Further, the bus synchronization circuit 60 puts the IRDY# signal in its active L level. As a result, at a time point T111 of the third rising edge of the clock CLK2, the TRDY# and IRDY# signals are simultaneously put in their L level so that the PCI address/data signal 202 is received by the data latch 42. At the same time, the bus synchronization circuit 60 asserts the RDY# signal in such a manner that the RDY# signal becomes its active L level at a time point T112. Since the clock CLK1 has the phase state P11 at the time point T111, the phase shift of the CLK1 is carried out so that the host bus data signal 103 is taken in by the CPU 10 at a time point T115 after a delay time tdly2.

Figure 9:
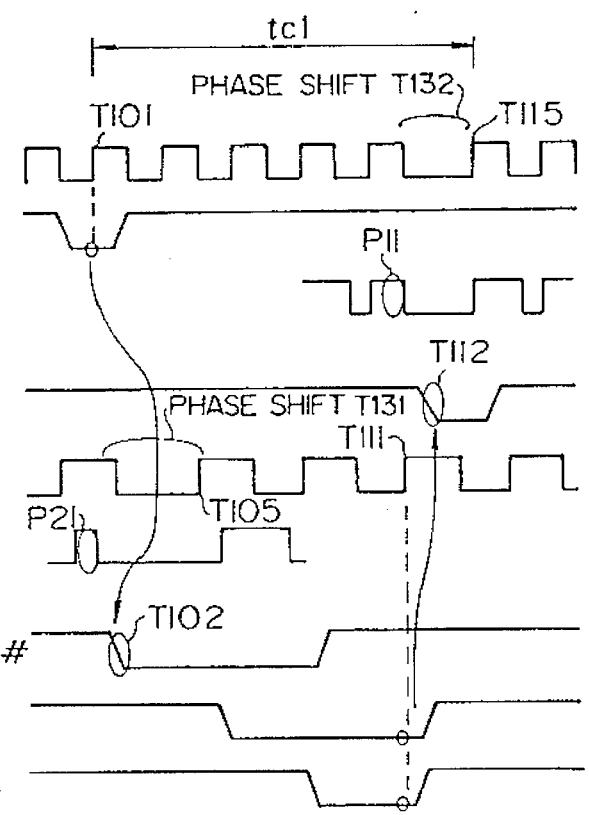
FIG. 9 is a timing chart for explaining yet another example of the operation of the information processor of FIG. 6.

In FIG. 9, the necessary read time corresponds to the time duration tc1 from the time T101 to the time T115. The time duration tc1 corresponds to 5.5 pulses in the clock CLK1, i.e., lasts 110 nsec. In this example, the synchronization overhead can be always reduced to zero regardless of the phase state of the clock CLK2 or the phase state of the clock CLK1 at the time point T111.

The influences by the synchronization overhead will now be considered. In FIG. 7, the synchronization overhead corresponds to a time duration between the time T101 and T103, i.e., corresponds to zero in the phase state P20, 2/3 periods of the clock CLK2 in the phase state P21, and 1/3 periods of the clock CLK2 in the phase state P22. One period of the clock CLK2 is 30 nsec. Accordingly, assuming that the phase state of the clock CLK2 at the time point T101 is uniformly generated, then an average value of the synchronization overhead is 10 nsec. Similarly, an average value of the synchronization overhead at the time T111 is 5 nsec. as seen in FIG. 8. Accordingly, when no phase shift is carried out, a synchronization overhead of about 15 nsec. takes place in addition to the time duration tc1 of the read cycle. That is, in the system of the present embodiment, the necessary time can be shortened about 10% compared to when no phase shift occurs, and thus it is expected that the transmission performance between the host bus 100 and PCI bus 204 can be correspondingly improved.

Figure 10:
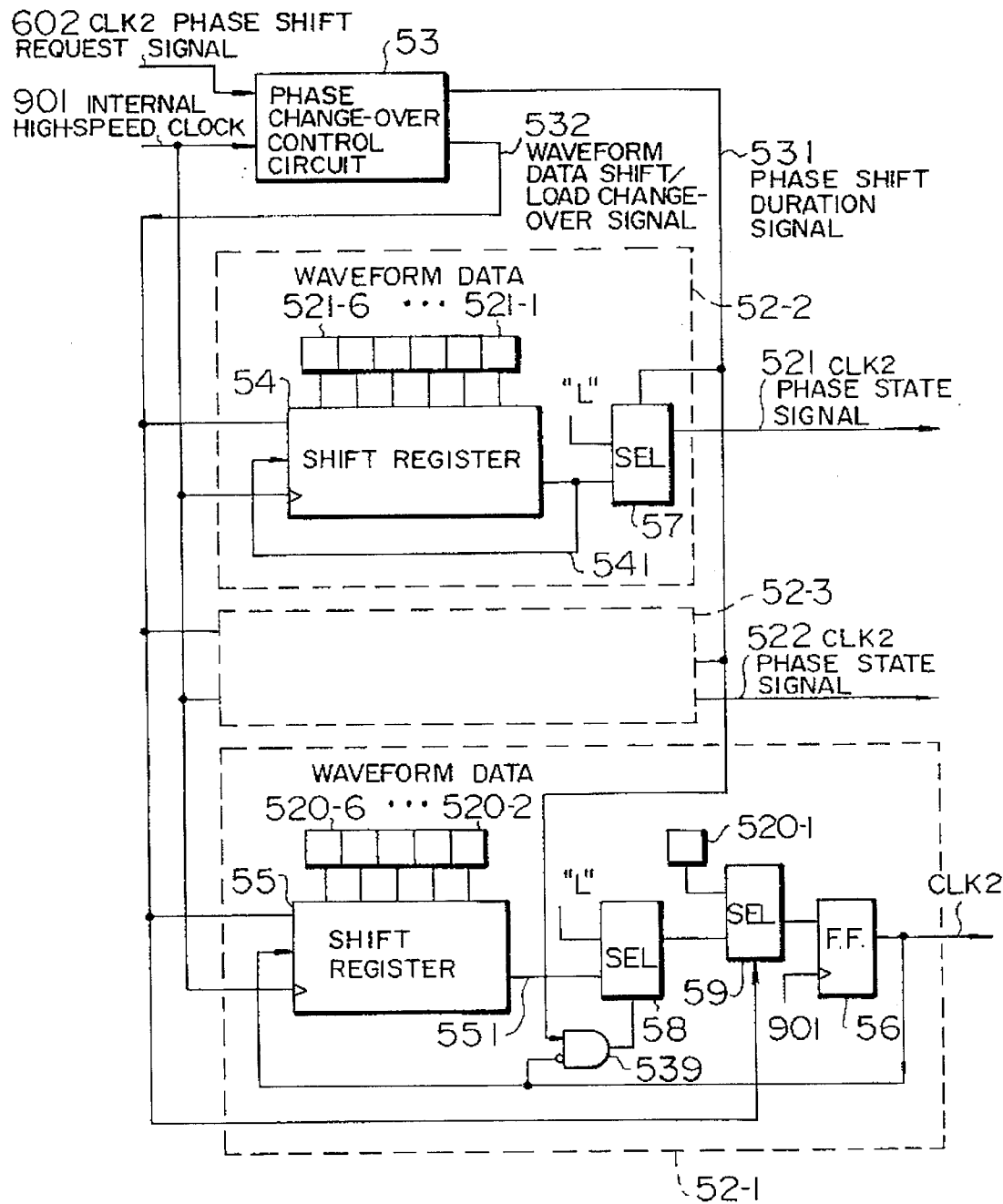
FIG. 10 is a block diagram of a specific example of a CLK2 generation circuit in FIG. 6.

FIG. 10 shows a block diagram of a specific example of the CLK2 generation circuit 52 in FIG. 6, which includes a clock generation circuit 52-1 for generating the clock CLK2, a phase state signal generation circuit 52-2 for generating the CLK1 phase state signal 521, another phase state generation circuit 52-3 for generating the CLK2 phase state signal 522 a phase change-over control circuit 53, shift registers 54 and 55, selectors 57, 58 and 59, a D flip-flop (which will be referred to as the D-FF) 56, an AND gate 539, waveform data 521-1, ..., and 521-6 for the CLK1 phase state signal 521, and waveform data 520-1, ..., and 520-6 for the clock CLK2.

The phase state generation circuit 52-3 for the CLK2 phase state signal 522 has an arrangement similar to that of the phase state signal generation circuit 52-2 for the CLK1 phase state signal 521. Thus, the details of the arrangement will be omitted in FIG. 10.

In operation of the specific example, when the phase shift request signal 602 issued from the bus synchronization circuit (see FIG. 6) 60 is in its inactive L level, a phase shift duration signal 531 as an output signal of the phase change-over control circuit 53 for defining the duration of the phase shift as well as a waveform data shift/load change-over signal 532 for loading waveform data in a shift register are both in their inactive L level. In this condition, the clocks CLK2 and the CLK1 phase state signals 521 and 522 have a periodic waveform. This will be explained in connection with FIG. 11.

That is, the phase state signal generation circuit 52-2 first starts its operation and simultaneously the waveform data shift/load change-over signal 532 becomes its H level for a duration corresponding to one period of the internal high-speed clock 901, whereby the waveform data 521-1, ..., and 521-6 held in the CLK1 phase state signal 521 are loaded in the shift register 54.

Then, the waveform data shift/load changeover signal 532 for restarting the clock after the phase shift becomes its L level, the shift register 54 sequentially outputs these waveform data 521-1, ..., and 521-6 in synchronism with the internal high-speed clock 901 to generate a signal 541 which comprises these waveform data 521-1, ..., and 521-6. The signal 541 is input to the shift register 54 in the order of the waveform data 521-1, ..., and 521-6 and sequentially output. This results in that the waveform data 521-1, ..., and 521-6 are repetitively circulated in the shift register 54 and the signal 541 having the repetitive waveform data 521-1, ..., and 521-6 is output from the shift register 54.

In this conjunction, the signal levels of the waveform data, i.e., inputs to the shift register are given in Table 2 below.

TABLE 2

| CLK2 waveform data | Signal level | Phase data 521 waveform data | Signal level | Phase data 522 waveform data | Signal level |
|---|---|---|---|---|---|
| 520-1 | H | 521-1 | L | 522-1 | L |
| 520-2 | H | 521-2 | L | 522-2 | H |
| 520-3 | H | 521-3 | L | 522-3 | H |
| 520-4 | L | 521-4 | L | 522-4 | H |
| 520-5 | L | 521-5 | L | 522-5 | H |
| 520-6 | L | 521-6 | H | 522-6 | L |

In Table 2, the waveform data 521-1, ..., and 521-5 are at L level while only the waveform data 521-6 is at H level, these 6 waveform data 521-1, ..., and 521-6 forming one cycle of waveform. Thus, the shift register 54 outputs the signal 541 of 33.33 ... MHz obtained by dividing the internal high-speed clock 901 of the 200 MHz by 6 with respect to frequency. The signal 541 is at L level during 5/6 of each period from the beginning and is at H level during the last 1/6 period.

Figure 11:
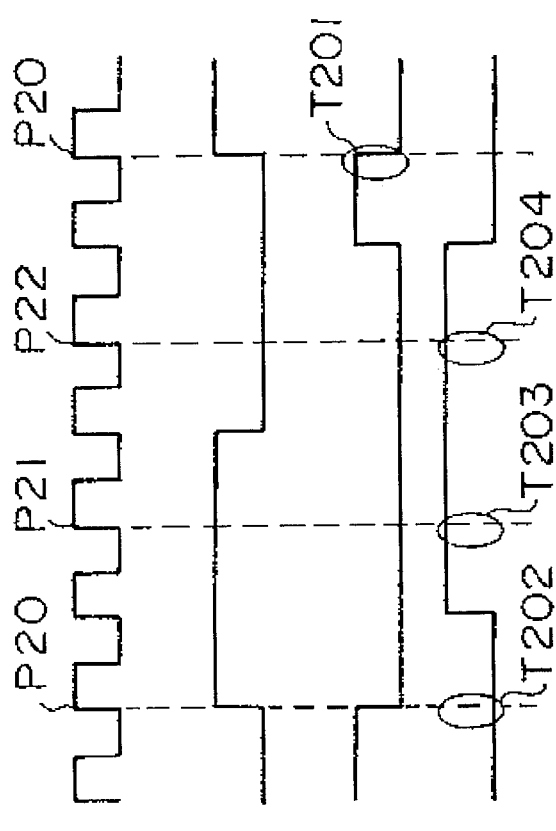
FIG. 11 is a timing chart for explaining a timing relationship among output signals of the CLK2 generation circuit of FIG. 10.

Further, since the phase shift duration signal 531 is at L level, the selector 57 selects the signal 541 which, in turn, are output as a CLK1 phase state signal 521 having a constant frequency of 33.33 . . . MHz as shown in FIG. 11. In the example, the phase state is represented by symbols L and H.

The clock generation circuit 52-1 first starts its operation, and the waveform data shift/load change-over signal 532 becomes at H level during one period of the internal high-speed clock 901, so that the waveform data 520-1, . . . , and 520-6 held in the signal are loaded into the shift register 55. Further, the selector 59 selects the waveform data 520-1 of H level during the H level of the waveform data shift/load change-over signal 532.

When the waveform data shift/load change-over signal 532 goes to L level, the shift register 55 out-puts the waveform data 520-2, 520-3, . . . , and 520-6 in this order. At this time, the phase shift duration signal 531 is at L level, so that the AND gate 539 has an output of L and the selector 58 selects the signal 551 containing the waveform data 520-2, 520-3, . . . , and 520-6 of the shift register 55. The change of the waveform data shift/load change-over signal 532 to the L level causes the selector 59 to select the output of the selector 58.

Thus, the D-FF 56 is first supplied with the waveform data 520-1, which is followed by the waveform data 520-2, 520-3, . . . , and 520-6 in this order. The D-FF 56 latches these waveform data 520-1, 520-2, . . . , and 520-6 in this order with use of the internal high-speed clock 901 as its latch pulse and generates an output in the form of the clock CLK2.

The clock CLK2 issued from the D-FF 56 is supplied to the shift register 55 in the order of the waveform data 520-1, 520-2, . . . , and 520-6 which are then output in this order therefrom. Such a series of waveform data 520-1, 520-2, . . . , and 520-6 are circulated through a loop of the shift register 55, selectors 58, 59, D-FF 56 and shift register 55 and then repetitively output from the D-FF 56.

As shown in Table 2, the waveform data 520-1 to 520-3 are at H level and the waveform data 520-4 to 520-6 are at L level, so that such a series of waveform data 520-1 to 520-6 completes a full cycle of waveform. Accordingly, the then-obtained clock CLK2 is a signal of a frequency of 33.33 . . . MHz obtained by dividing the internal high-speed clock 901 of 200 MHz by 6 with respect to frequency similarly to the CLK2 phase state signal 521, but the signal is at H level during the former 1/2 of each period and is at L level during the latter 1/2 of the period, as shown in FIG. 11.

When the phase state generation circuit 52-3 similarly sets the signal levels of waveform data 522-1, 522-2, 522-3, 522-4, 522-5 and 522-6, there can be obtained a CLK2 phase state signal 522 as shown in FIG. 11, that is, its frequency is the same as that of the clock CLK2 or CLK1 phase state signal 521 but the signal 522 is L level during the first 1/6 of each period and during the last 1/6 of the period and at H level during the remaining part of the period.

In FIG. 11, this indicates that the CLK2 phase state signal 521 is at H level at the time T201 and the clock CLK2 changes from L level to H level in synchronism with a rising edge of the internal high-speed clock 901. At the time T202, T203 and T204, the CLK2 phase state signal 522 corresponds to the timing relationship in FIG. 7, that is, the CLK2 phase state signal 522 at the time points T203 and T204 is at H level in such phase states P21 and P22 that require the phase shift of the clock CLK2, whereas the CLK2 phase state signal 522 at the time point T202 is at L level in such a phase state P20 that requires no phase shift of the clock CLK2.

Figure 12:
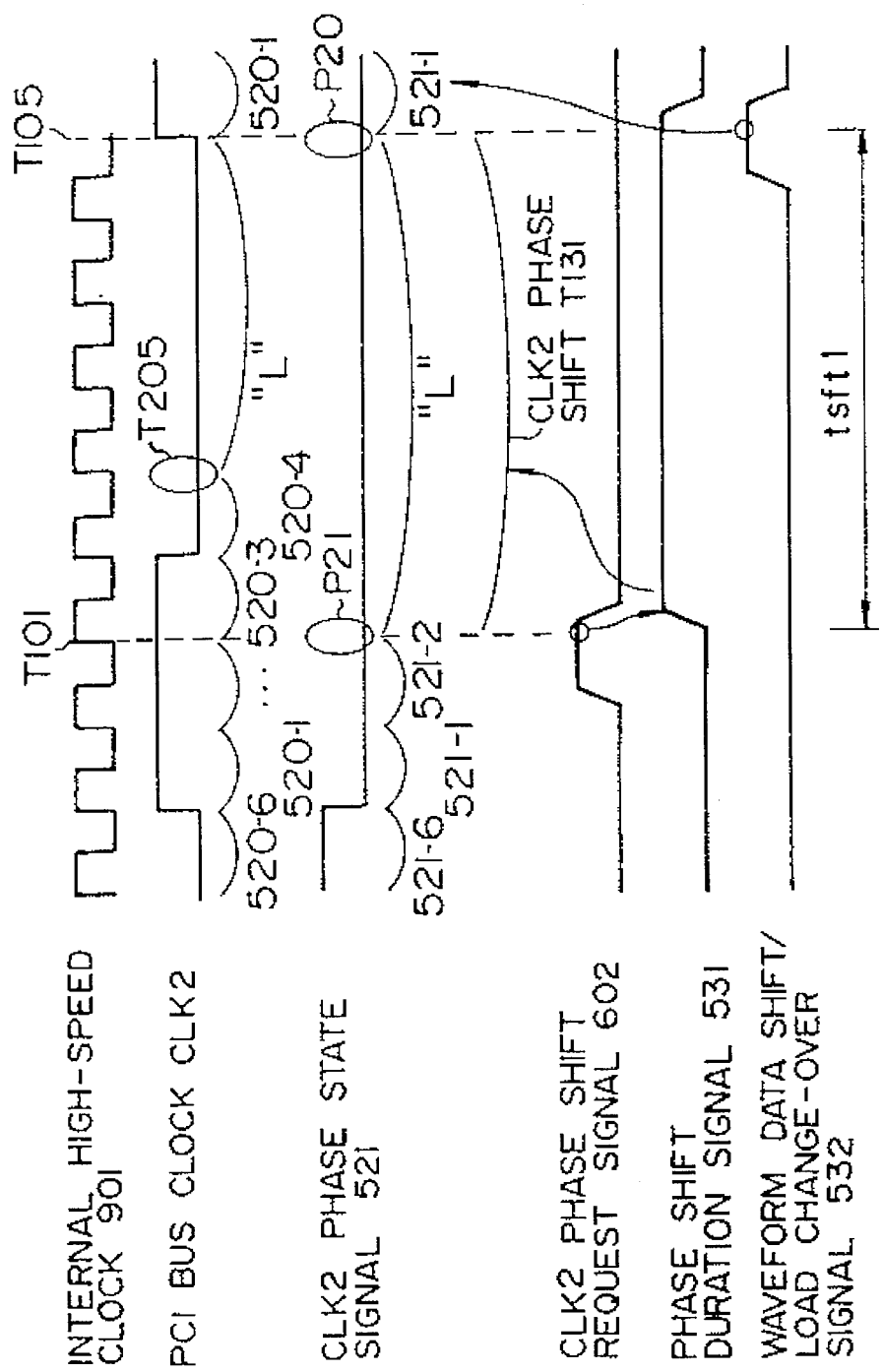
FIG. 12 is a timing chart for explaining the phase shifting operation of the CLK2 generation circuit of FIG. 10.

Next the operation of the specific example in its phase shift mode will be explained with reference to FIG. 12. In the drawing, when the CLK2 phase shift request signal 602 is asserted to its active H level at the time T101, the phase change-over control circuit 53 asserts the phase shift duration signal 531 to its active H level at the time T101 of a rising edge of the internal high-speed clock 901. The phase change-over control circuit 53 counts the internal high-speed clock 901 during a time duration corresponding to one period of the clock CLK2 and returns the phase shift duration signal 531 to L level at the sixth time point T105. A time duration between the time T101 and T105 corresponds to a phase shifting operation T131 of the clock CLK2.

During this phase shifting operation T131, the selector 57 in the phase state signal generation circuit 52-2 selects L level according to the phase shift duration signal 531 of H level to negate the CLK2 phase state signal 521 (to put the signal 521 in its L level). For this reason, in FIG. 12, the CLK2 phase state signal 521 becomes L level from the time point T101, following the waveform data 521-2.

During the phase shifting operation T131, when the clock CLK2 is at L level in the clock generation circuit 52-1, the output of the AND gate 539 is asserted to its H level so that the selector 58 selects an of L level input. This causes the output of the selector 59 to also be put in its L level.

Assuming that the waveform data 520-1 and 520-2 of H level are sequentially output from the selector 59 so that the clock CLK2 is at H level and the phase shift duration signal 531 is at H level at the time T101 at which the waveform data 520-3 of H level is output, then output of the next waveform data 520-4 of L level from the D-FF 56 means that the selector 58 selects an input of L level, whereby the clock CLK2 maintains its L level from the time T205 after the selection of the waveform data 520-4.

Further, the phase change-over control circuit 53 asserts the waveform data shift/load changeover signal 532 to its H level at the time T105 to initialize the phase state of the clock CLK2 to P20. That is, the assertion of the waveform data shift/load change-over signal 532 to H level at the time point T105 causes the waveform data 521-1, . . . , and 521-6 to be again loaded in the shift register 54 while the waveform data 520-1 of H level to be selected by the selector 59. The selector 59, selecting the waveform data 520-1 once, selects the output of the selector 58. At the same time, the phase shift duration signal 531 is asserted to its L level, so that the output of the AND gate 539 becomes L level and the selector 58 selects the signal 551 of the shift register 55.

Thus, the waveform data 520-1 is output from the D-FF 56 at the time T105, which is followed by the fact that the waveform data 520-2, . . . , and 520-6 are sequentially output therefrom. The waveform data 520-1, 520-2, . . . , and 520-6 issued from the D-FF 56 are also returned to the shift register 55, after which such a series of waveform data are repetitively circulated through a loop of the shift register 55, selectors 58, 59, D-FF 56 and shift register 55. Accordingly, a periodic clock CLK2, such as that mentioned above is again obtained from the D-FF 56.

Although an explanation has been given regarding the CLK2 generation circuit 52, the CLK1 generation circuit 51 also has substantially the same structure as the circuit 52, and thus explanation thereof is omitted. The CLK1 generation circuit 51 divides the internal high-speed clock 901 by 4 with respect to frequency to generate the clock CLK1 and the CLK1 phase state signals 511 and 512, for which reason the waveform data for generating them are different from those in the CLK2 generation circuit 52. In this connection, the former half (1/2) of each period of the clock CLK1 is at H level and the latter half thereof is at L level, whereas the former 3/4 of each period of the CLK1 phase state signals 511 and 512 is at L level and the last 1/4 thereof is at H level. Further, the CLK1 phase state signal 512 has its L level in the first 1/4 of each period of the signal 512 and in the last 1/4 thereof while has its H level in the remainder 2/4 thereof.

The bus synchronization circuit 60 in FIG. 6 switches the assertion timing of the FRAME# and RDY# signals with use of the CLK1 phase state signals 511 and 512 issued from the CLK1 generation circuit 51 and the CLK2 phase state signal 521 issued from the CLK2 generation circuit 52.

Figure 13:
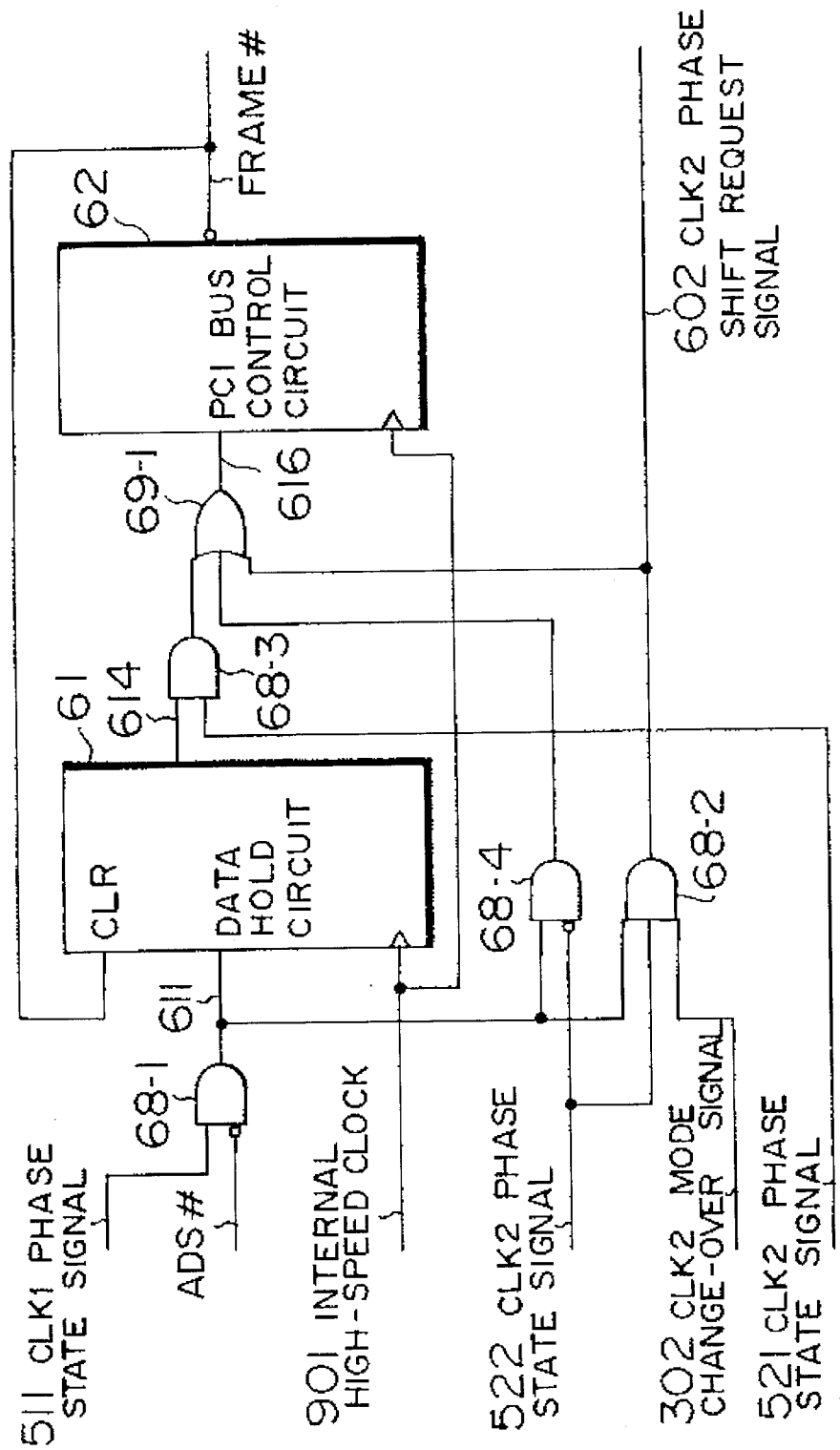
FIG. 13 is a block diagram of a specific example of a frame# generation circuit in a bus synchronization circuit in FIG. 10.

FIG. 13 is a block diagram of a specific example of a FRAME# signal generation circuit in the bus synchronization circuit 60, which circuit generates the FRAME# signal only when receiving the ADS# signal and which includes a data hold circuit 61, a PCI bus control circuit 62, AND gates 68-1 to 68-4, and an OR circuit 69-1.

A circuit for generating the RDY# signal may also have a similar arrangement as described above. Thus, an explanation will be given regarding only the FRAME# signal generation circuit, and thus explanation for the RDY# signal generation circuit is omitted.

In FIG. 13, the data hold circuit 61 samples and holds an output signal 611 of the AND gate 68-1 according to the internal high-speed clock 901 and, when the output signal 611 has a H level, asserts an output 614 thereof to H level. The output 614 of the data holding means 61 is kept at H level until the FRAME# signal is changed to L level to clear the data holding means 61.

The PCI bus control circuit 62 starts the PCI bus cycle from a rising edge of the internal high-speed clock 901 when an output signal 616 of the OR circuit 69-1 is at H level. At the same time, the PCI bus control circuit 62 asserts the FRAME# signal from its H level to active L level.

The operation of the FRAME# generation circuit will then be explained with use of FIGS. 14, 15 and 16.

FIG. 14 shows a case where the CLK2 phase state signal 522 at the host-bus cycle start time T101 has the phase state P21. In the drawing, in this case, since the ADS# signal is at L level at the time T141 at which the CLK1 phase state signal 511 immediately before the time point T101 is changed to H level, the output signal 611 of the AND gate 68-1 is at H level, which means that the read cycle was started on the host bus 100. Further, the CLK2 phase state signal 522 at the time T101 is at H level, which means the state "phase shift allows data transmission at a rising edge of the clock CLK2". For this reason, the AND gate 68-2 outputs the CLK2 phase shift request signal 602 of H level to request the CLK2 generation circuit 52 (see FIG. 6) to perform a phase shift of the clock CLK2. As a result, as earlier explained in connection with FIG. 12, the clock CLK2 is subjected to a phase shift so that the clock CLK2 is asserted from its L level to H level at the time T105 after the predetermined time tsft1 from the time T101.

Further, since the output signal 616 of the OR circuit 69-1 is changed to its H level, the PCI bus control circuit 62 starts the PCI bus cycle in synchronism with the time T142 of a rising edge of the internal high-speed clock 901 and asserts the FRAME# signal from its H level to L level at the time point T102 after the delay time tdly1. Since the setup time tsu1 for the time T102 is satisfied at the time T105, the PCI target 21 (see FIG. 6) takes in the PCI address/data signal 202 at the time T105.

FIG. 15 shows a case where the CLK2 phase state signal 522, at the time T101, has the phase state P20.

This case indicates that the output signal 611 of the AND gate 68-1 is at H level and the read cycle is started on the host bus 100 (see FIG. 6). Further, the CLK2 phase state signal 522 at the time point T101 is at L level, which means the state "phase shift is unnecessary". For this reason, the CLK2 phase shift request signal 602 is at L level indicative of an inactive state.

Since the output signal 611 of the AND gate 68-1 is at H level, an output of the AND gate 68-4 and the output signal 616 of the OR circuit 69-1 are both at H level, which results in that the PCI bus control circuit 62 starts the PCI bus cycle in synchronism with the time point T142 of a rising edge of the internal high-speed clock 901 and assets the FRAME# signal from its H level to L level at the time point T102.

Since the setup time tsu1 for the time T102 is satisfied at the time T103 at which the clock CLK2 rises, the PCI target 21 (see FIG. 6) takes in the PCI address/data signal 202 at the time T103.

FIG. 16 shows a case where the clock CLK2 has the phase state P21 at the host-bus cycle start time T101 and the CLK2 mode change-over signal 302 is at L level. This case indicates that the output signal 611 of the AND gate 68-1 is at H level and the read cycle is started on the host bus 100. In this case, the CLK2 phase state signal 522 at the time point T101 is at H level as in FIG. 14, which means the state "phase shift allows data transmission at the next rising edge of the clock CLK2". However, since the CLK2 mode change-over signal 302 is at L level at which phase shift is inhibited, the CLK2 phase shift request signal 602 has its inactive L level.

Meanwhile, in synchronism with the time point T142 of a rising edge of the internal high-speed clock 901, the data hold circuit 61 holds the output signal 611 at its H level. Thereafter, when the CLK2 phase state signal 521 is changed to its H level at the time T143, the AND gate 68-3 passes therethrough the output 614 of H level received from the data hold circuit 61, whereby the output signal 616 of the OR circuit 69-1 is changed to H level and the PCI bus control circuit 62 starts the PCI bus cycle in synchronism with the time T144 of a rising edge of the internal high-speed clock 901. As a result, the FRAME# signal is asserted from its H level to L level.

Since the setup time tsu1 for the time point T106 is satisfied at the time T146 at which the clock CLK2 rises, the PCI target 21 takes in the PCI address/data signal 202 at the time T146. Thereafter, the output signal 614 of the data hold circuit 61 is cleared to L level in synchronism with the time T145.

Through the above operations, when the CLK2 mode change-over signal 302 is at H level, a phase shift is carried out over the PCI bus clock CLK2; whereas, when the signal 302 is at L level, the PCI bus clock CLK2 of an always constant period is output. When a CLK1 mode change-over signal 301 is at H level, the phase shift is carried out over the host bus clock CLK1, while when the signal 301 is at L level, the host bus clock CLK1 of an always constant period is output.

In some of CPUs available from the market, a phase shift of the host bus clock CLK1 may cause erroneous operation. This is because the CPU chip generates an internal operating clock from a PLL circuit built therein. For this reason, the bus conversion circuit 31 in FIG. 6 can switch between the execution or non-execution of a phase shift according to the CLK1 mode change-over signal 301.

With the bus conversion circuit 31 in the present embodiment, even when the host bus 100 and PCI bus 204 use upper limit operating frequencies determined by the circuit delay time or setup time, its synchronization overhead can be reduced so long as the operating frequency ratio therebetween is a natural number ratio. In the present embodiment, the CPU 10 has an upper limit operating frequency of 50 MHz and the PCI bus 204 has an upper limit frequency of 33.3 . . . MHz, which does not involve reduction of the data transmission performance between the host bus 100 and PCI bus 204. This can be realized only with the present embodiment. Further, the bus conversion circuit 31 generates the clocks CLK1 and CLK2 for the respective buses 100 and 204 from the single reference clock 801 of the crystal oscillator 80. This enables decrease of the physical quantity necessary for the crystal oscillator and information processor.

Figure 17:
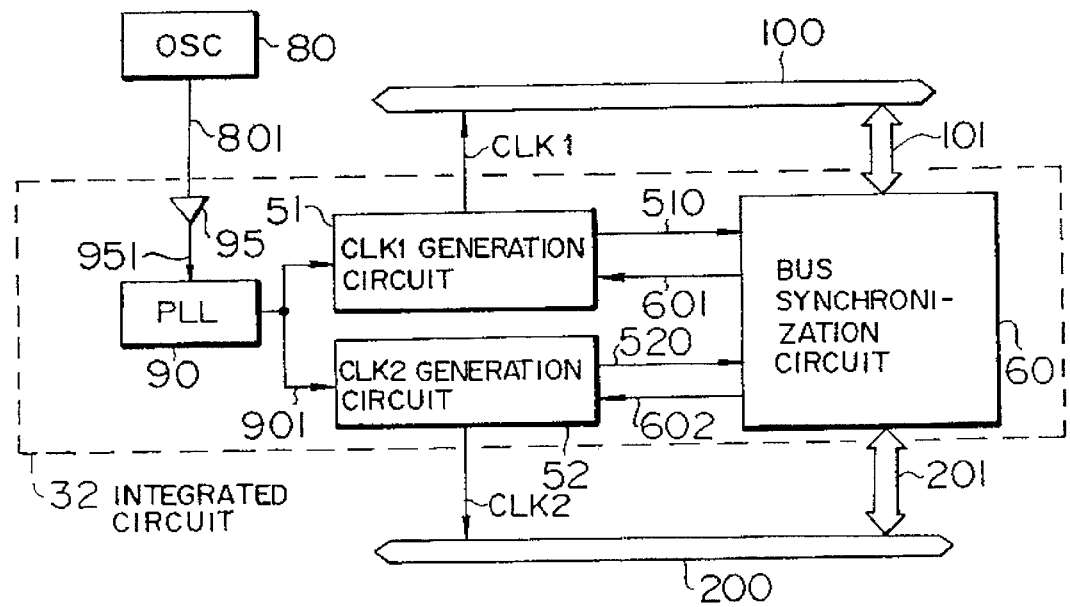
FIG. 17 is a block diagram of an information processor of a bus synchronizing system in accordance with a third embodiment of the present invention.

Referring to FIG. 17, there is shown a block diagram of an information processor of a bus synchronizing system in accordance with a third embodiment of the present invention, in which an integrated circuit is denoted by reference numeral 32. In the drawing, the reference clock 801 having a constant frequency is supplied from the external crystal oscillator 80 to the integrated circuit 32. In the integrated circuit 32, the reference clock 801 is supplied to the PPL circuit 90 through an input buffer 95 and frequency-multiplied so that the PPL circuit 90 generates the internal high-speed clock 901 of the integrated circuit 32. The CLK1 generation circuit 51 frequency-divides the internal high-speed clock 901 to generate the clock CLK1, while the CLK2 generation circuit 52 frequency-divides the internal high-speed clock 901 to generate the clock CLK2.

The frequency of the internal high-speed clock 901 is set at a common multiple of the frequencies of the 2 clocks CLK1 and CLK2. A frequency ratio between the clocks CLK1 and CLK2 can be set to be a natural number. For example, when the clock CLK1 has a frequency of 50 MHz and the clock CLK2 has a frequency of 33.3 . . . Hz, the frequency of the internal high-speed clock 901 is set at 100 MHz or 200 MHz.

When it is desired to directly externally drive such a clock having a high frequency as the internal high-speed clock 901, such a high speed logic element as an emitter coupled logic (ECL) element is required as the input buffer 95 of the integrated circuit 32. For the purpose of improving the integration density of the integrated circuit 32 and reducing power consumption, on the other hand, a CMOS element becomes necessary in the logic circuit of the integrated circuit 32. Accordingly, a special fabricating process becomes necessary for fabricating the ECL element and the CMOS element in a single IC chip. In order to reduce the unit price of the chip, there is an advantageous system such that the internal high-speed clock 901 is generated by externally supplying the reference clock 801 having a low frequency and frequency-dividing the reference clock 801 by the PPL circuit 90 within the integrated circuit 32. Further, since the reference clock 801 is frequency-multiplied by the PPL circuit 90, the CLK1 generation circuit 51, CLK2 generation circuit 52 and bus synchronization circuit 60 can be operated with the higher-speed internal operating clock, so that finer phase control can be realized and its synchronization overhead can be correspondingly decreased.

Figure 18:
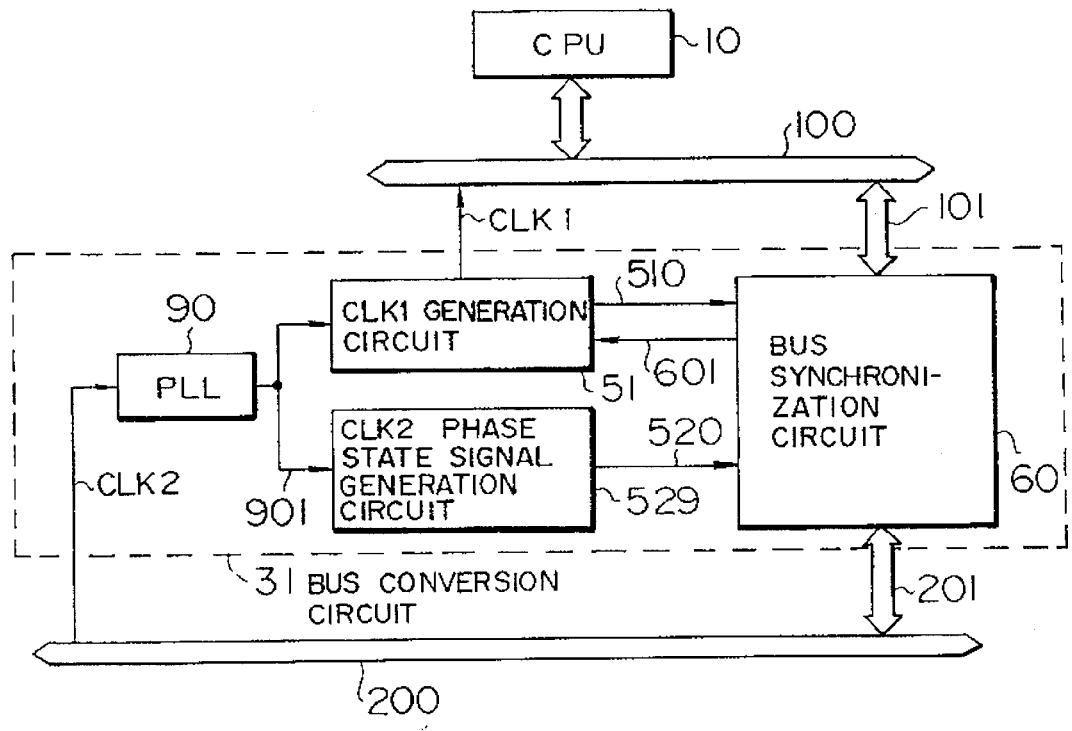
FIG. 18 is a block diagram of an information processor of a bus synchronizing system in accordance with a fourth embodiment of the present invention.

Turning to FIG. 18, there is shown a block diagram of an information processor of a bus synchronizing system in accordance with a fourth embodiment of the present invention, in which a CLK2 phase state signal generation circuit is denoted by reference numeral 529 and parts corresponding to those in the previous drawings are denoted by the same reference numerals.

In the present embodiment, as illustrated, the system bus clock CLK2 having a constant period is used as a reference clock and the bus conversion circuit 31 generates therein the clock CLK1, CLK1 phase state signal 510 and CLK2 phase state signal 520 from the reference clock CLK2.

Use of such a bus conversion circuit 31 enables the CPU 10 having an operating frequency different from the clock CLK2 to be connected while eliminating the need for modifying the CLK2 supply circuit on the prior art system bus 200. Further, when it is desired to transmit data from the system bus 200 to the host bus 100, the synchronization overhead can be reduced. In addition, since the clock CLK1 is generated from the clock CLK2, a crystal oscillator for generating the clock CLK1 becomes unnecessary.

Figure 19:
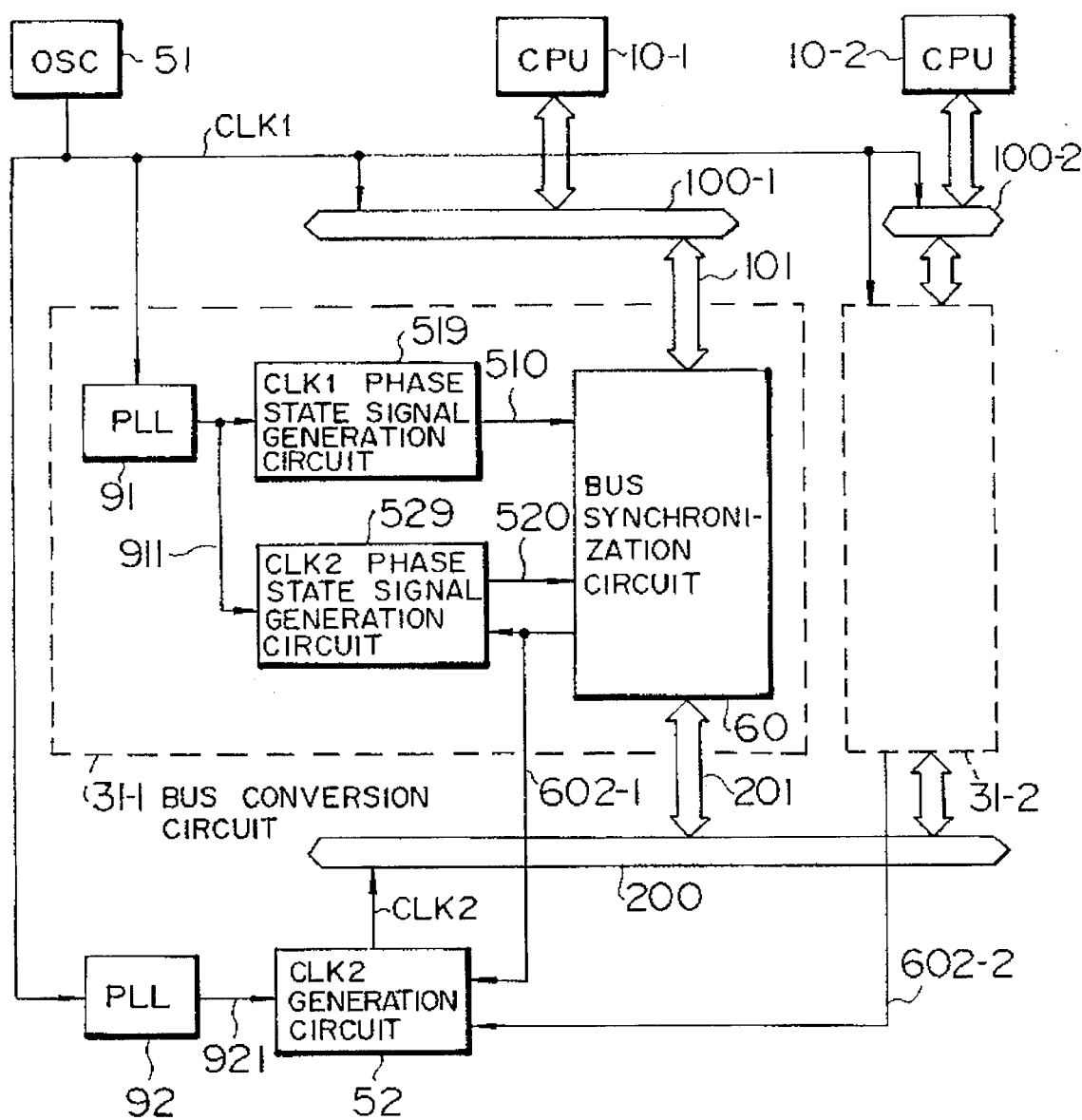
FIG. 19 is a block diagram of an information processor of a bus synchronizing system in accordance with a fifth embodiment of the present invention.

FIG. 19 shows a block diagram of an information processor of a bus synchronizing system in accordance with a fifth embodiment of the present invention, which includes CPUs 10-1 and 10-2, host buses 100-1 and 100-2, a system bus 200, bus conversion circuits 31-1 and 31-2, a CLK1 generation circuit 51, a CLK2 generation circuit 52, a CLK1 phase state generation circuit 519, a CLK2 phase state signal generation circuit 529, a bus synchronization circuit 60, a CLK1 PLL circuit 91, and a CLK2 PLL circuit 92.

In the bus conversion circuit 31-1, the CLK1 phase state signal 510 is generated by the CLK1 phase state generation circuit 519, the CLK2 phase state signal 520 is generated by the CLK2 phase state signal generation circuit 529, the clocks CLK1 and CLK2 are generated by the CLK1 generation circuit 51 and CLK2 generation circuit 52 outside the bus conversion circuit 31-1 and then supplied to the host buses 100-1 and 100-2 and the system bus 200, respectively. For this reason, a plurality of bus conversion circuits 31-1 and 31-2 can be connected onto the system bus 200 and thus the present embodiment can be applied to an information processing system of a multi-processor structure.

The frequency ratio between the clocks CLK1 and CLK2 can be set to be an arbitrary natural number. The bus conversion circuit 31-1 performs phase shifting operation over the clock CLK2 at the time of synchronization from the host bus 100-1 to the system bus 200. The bus conversion circuit 31-2 performs phase shifting operation over the clock CLK2 at the time of synchronization from the host bus 100-2 to the system bus 200. Thus, the synchronization overhead on the system bus 200 can be reduced and the operating efficiency of the system bus 200 in the multi-processor arrangement can be improved.

Figure 20:
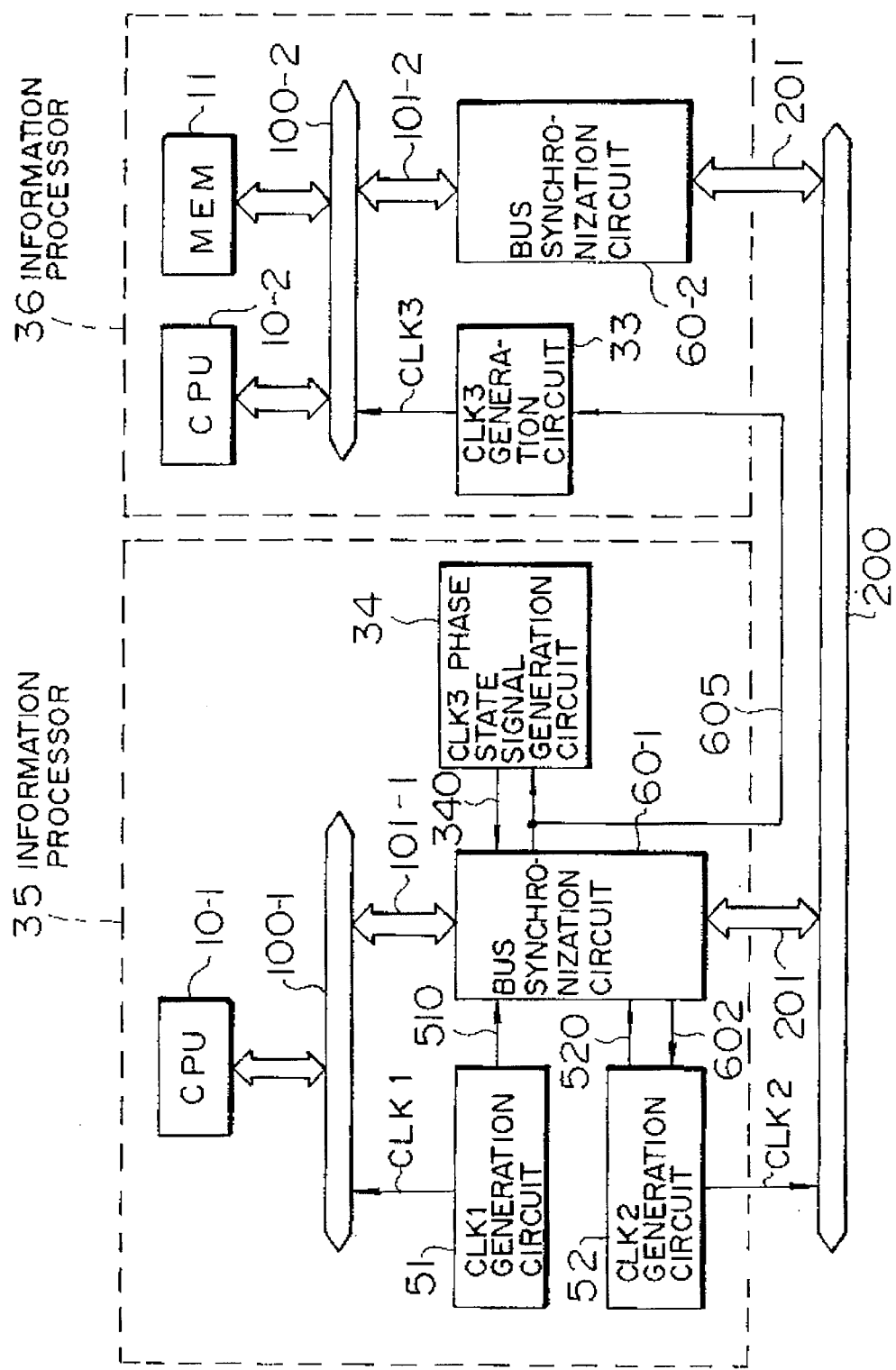
FIG. 20 is a block diagram of an information processor of a bus synchronizing system in accordance with a sixth embodiment of the present invention.

FIG. 20 shows a block diagram of an information processor of a bus synchronizing system in accordance with a sixth embodiment of the present invention, which includes CPUs 10-1 and 10-2, a main memory (MEM) 11, host buses 100-1 and 100-2, a system bus 200, host bus signals 101-1 and 101-2, a system bus signal 201, a CLK3 signal generation circuit 33, a CLK3 phase state generation circuit 34, a CLK3 phase state signal 340, information processors 35 and 36, a CLK1 generation circuit 51, a CLK2 generation circuit 52, a CLK1 phase state signal 510, a CLK2 phase state signal 520, bus synchronization circuits 60-1 and 60-2, a CLK2 phase shift request signal 602, and a CLK3 phase shift request signal 605.

The present embodiment is designed so that, even when it is desired to transmit a bus signal via a plurality of buses, the synchronization overhead can be reduced.

Then, explanation will be made as to the operation of the present embodiment when an access is made from the CPU 10-1 of the information processor 35 to the main memory 11 of the information processor 36 by referring to FIG. 21. In this connection, for easy understanding of its explanation, it is assumed that arbitration on the host bus 100-2 is already made. That is, this condition is considered that the CPU 10-2 is in its high impedance state and only the main memory 11 is present on the host bus 100-2.

In FIGS. 20 and 21, the frequency of the host bus clocks CLK1 and CLK3 of the information processors 35 and 36 is 50 MHz, the frequency of the system bus clock CLK2 is 20 MHz, and a frequency ratio therebetween is 5 to 2. Further, a delay time caused by a circuit delay when the system bus signal 201 is issued is denoted by reference symbol tdly3 and a setup time on the system bus is denoted by reference symbol tsu3. Furthermore, a delay time when the host bus signal 101-2 is issued is denoted by reference symbol tdly4 and a setup time on the host bus signal 101-2 is denoted by reference symbol tsu4.

At the time T301, at which the host bus signal 101-1 is made valid, the bus synchronization circuit 60-1 looks up the CLK1 phase state signal 510, CLK2 phase state signal 520 and CLK3 phase state signal 340, and determines the next rising edge timings of the host bus clocks CLK2 and CLK3. Assuming that a time between the time T301 and the time T302 of a rising edge of the system bus clock CLK2 is denoted by reference symbol tsft3, then the following relationship is satisfied at the time of synchronization from the host bus 100-1 to the system bus 200 within the information processor 35 tsft3>tdly3+tsu3.

That is, the time tsft3 varies with the phase state of the system bus clock CLK2 at the time point T301 and phase shift is carried out over the system bus clock CLK2 so as to always minimize the synchronization overhead. At the time T304 after the delay time tdly3 from the time point T301, the system bus signal 201 is made valid and, since the time T302 of a rising edge of the system bus clock CLK2 satisfies the setup time tsu3 for the time T304, the synchronization circuit 60-2 latches the system bus signal 201 at the time T302.

At the same time, the synchronization circuit 60-2 carries out synchronizing operation from the system bus 200 to the host bus 100-2 of the information processor 36. Assuming that a time of from the time T301 to the time T303 of a rising edge of the host bus clock CLK3 is denoted by reference symbol tsft4, then the following relationship is satisfied.

tsft4>tdly3+tdly4+tsu4.

Since the synchronization circuit 60-2 is operated as a transparent latch, after the system bus signal 201 is made valid at the time T304, the host bus signal 101-2 is made valid at the time T305 after the delay time tdly4. Further, the synchronization circuit 60-2 holds the level of the system bus signal 201 at the time T302. Accordingly, the host bus signal 101-2 is made valid at the time T305 after passage of a time (tdly3+tdly4) from the time T301 and, since the time T303 of a rising edge of the host bus clock CLK3 satisfies the setup time tsu4 for the time T305, the main memory 11 of the information processor 36 takes in the host bus signal 101-2 at the time T303.

Now comparison will be made with a case of not using the bus synchronizing system of the present embodiment. When no phase shift is carried out over the system bus clock CLK2, the system bus clock CLK2 rises at the time T311, at which time the bus synchronization circuit 60-1 takes in the host bus signal 101-1 and transmits the system bus signal 201 to the system bus 200. Thereafter, the system bus signal 201 is made valid at the time T315 after the delay time tdly3.

The synchronization circuit 60-2 takes in the system bus signal 200 at the time T312 of the next rising edge of the system bus clock CLK2 and transmits the host bus signal 101-2. The host bus signal 101-2 is made valid at the time T316 after the delay time tdly4, and the main memory 11 of the information processor 36 takes in the host bus signal 101-2 at the time T314 of the next rising edge of the host bus clock CLK3.

In this way, since the synchronization overhead is reduced based on the bus synchronizing system of the present embodiment, a time duration between the time T303 and T314 can be shortened and thus the data transmission performance between the information processors 35 and 36 can be improved. Values of the times tsft3 and tsft4 for the phase states of the system and host bus clocks CLK2 and CLK3 at the time T301 may be held in the form of a table stored in the bus synchronization circuit 60-1.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A bus synchronizing system, comprising:

first clock generation means for generating a first clock;

a first bus operated in synchronism with the first clock;

second clock generation means for generating a second clock a second bus operated in synchronism with the second clock;

synchronization means for performing timing conversion of a bus signal between said first and second buses;

first phase state signal generation means for generating a phase state signal indicative of a phase state of the first clock; and second phase state signal generation means for generating a phase state signal of the second clock, wherein the bus signal synchronization means compares the phase state of the first clock with the phase state of the second clock, at least one of the first and second clock signal generation means performs phase shifting over the first or second clock on the basis of the comparison result by the bus signal synchronization means to thereby reduce synchronization overhead generated during transmission of the bus signal between the first and second buses.

2. A bus synchronizing system as set forth in claim 1, wherein said first and second clock generation means generate the first clock and the second clock respectively, said first and second phase state signal generation means generate the phase state signals of the first and second clocks respectively and a PLL circuit generates an internal clock having a frequency corresponding to a common frequency multiple of a reference clock, and further divides the internal clock with respect to frequency to thereby generate the first clock, second clock, the phase state signal of the first clock and the phase state signal of the second clock with use of at least one or more PLL circuits.

3. A bus synchronizing system as set forth in claim 2, wherein the frequency ratio of the first clock to second clock is expressed by arbitrary natural numbers.

4. A bus synchronizing system as set forth in claim 2, wherein one or more PLL circuits, said first clock generation means, said first phase state signal generation means, said second clock generation means, said second phase state signal generation means and said bus synchronization means are collectively mounted in the form of an integrated circuit.

5. A bus synchronizing system as set forth in claim 1, wherein said synchronizing means outputs a phase shift request signal to at least one of said first clock generation means and said second clock generation means on the basis of a comparison result of the phase state signals.

6. A bus synchronizing system as set forth in claim 1, wherein said synchronization means compares the phase state signals and when the 2 phase state signals cause a synchronization overhead, outputs a phase shift request signal to at least one of the first clock generation means and the second clock generation means.

7. A bus synchronizing system as set forth in claim 1, wherein said first clock generation means, said first phase state signal generation means, said second clock generation means, said second phase state signal generation means and said bus synchronization means are collectively mounted in the form of an integrated circuit.

8. A bus synchronizing system, comprising:

a first bus operated in synchronism with a first clock;

a second bus operated in synchronism with a second clock;

a third bus operated in synchronism with a third clock;

a first clock generation circuit for outputting a phase state signal indicative of a phase state of the first clock;

a second clock generation circuit for outputting a phase state signal indicative of a phase state of the second clock;

a third clock generation circuit generation circuit for outputting a phase state signal indicative of a phase state of the third clock;

first bus synchronization means for performing synchronization of a bus signal between said first and second buses; and second bus synchronization means for performing synchronization of a bus signal between said second and third buses, wherein said first bus synchronization means compares the phase state signal of said first clock, the phase state signal of said second clock and the phase state signal of said third clock, and at least one of said first, second and third clock generation means performs phase shifting over the first, second or third clock on the basis of the comparison result of said first bus synchronization means to thereby reduce synchronization overhead generated when the bus signal is transmitted from the first bus via the second bus to the third bus.

9. A bus synchronizing method comprising the steps of:

generating respective phase state signals of at least two clocks of synchronous buses when said at least two clocks are transmitted through the buses, said respective phase state signals indicating phase states of the respective clocks;

defining a phase state combination for performing phase shift, clocks to be phase shifted and respective phase shift duration times, the phase shift duration times being defined to reduce synchronization overhead during transmission of the bus signals;

comparing the phase state signals; and performing phase shifts of the defined phase shift duration times over the defined clocks when the comparison results coincide with the defined phase state combination.

* * * * *